US012691570B2

(12) United States Patent
Zhang et al.

(10) Patent No.: US 12,691,570 B2
(45) Date of Patent: Jul. 28, 2026

(54) RIGID-FLEXIBLE COUPLING ROBOTIC ARM TYPE MEASUREMENT PLATFORM AND METHOD FOR PLANT PHENOTYPE INFORMATION

(71) Applicant: NANJING FORESTRY UNIVERSITY, Nanjing (CN)

(72) Inventors: Huichun Zhang, Nanjing (CN); Liwen Zhou, Nanjing (CN); Liming Bian, Nanjing (CN); Hongping Zhou, Nanjing (CN)

(73) Assignee: NANJING FORESTRY UNIVERSITY (CN)

( * ) Notice: Subject to any disclaimer, the term of this patent is extended or adjusted under 35 U.S.C. 154(b) by 46 days.

(21) Appl. No.: 19/021,305

(22) Filed: Jan. 15, 2025

(65) Prior Publication Data

US 2025/0345925 A1 Nov. 13, 2025

(30) Foreign Application Priority Data

May 13, 2024 (CN) .......................... 202410588322.6

(51) Int. Cl.
| | |
|---|---|
| *B25J 5/00* | (2006.01) |
| *B25J 9/10* | (2006.01) |
| *B25J 9/16* | (2006.01) |
| *B25J 13/08* | (2006.01) |
| *B25J 15/00* | (2006.01) |
| *B25J 18/02* | (2006.01) |

(52) U.S. Cl.
CPC ............. *B25J 5/005* (2013.01); *B25J 9/1025* (2013.01); *B25J 9/1697* (2013.01); *B25J 13/081* (2013.01); *B25J 15/0009* (2013.01); *B25J 18/025* (2013.01)

(58) Field of Classification Search
CPC ........ B25J 5/005; B25J 9/1025; B25J 9/1697; B25J 13/081; B25J 15/0009; B25J 18/025; B25J 5/007; B25J 11/00; B25J 5/00; B25J 15/08; B25J 18/00; B25J 19/02
See application file for complete search history.

(56) References Cited

U.S. PATENT DOCUMENTS

| | | | | |
|---|---|---|---|---|
| 9,120,233 B2 * | 9/2015 | Moore | .................. | B25J 13/086 |
| 12,226,895 B1 * | 2/2025 | Nambi | ................ | B25J 15/0009 |

(Continued)

FOREIGN PATENT DOCUMENTS

| | | |
|---|---|---|
| CN | 110253614 A | 9/2019 |
| CN | 116038666 A | 5/2023 |
| CN | 116295170 A | 6/2023 |

*Primary Examiner* — Abby Lin
*Assistant Examiner* — Renee LaRose

(57) ABSTRACT

The present invention discloses is a rigid-flexible coupling robotic arm type measurement platform and method for plant phenotype information. The measurement platform includes a crawler walking module, a flexible robotic arm module and a soft mechanical hand module; the soft mechanical hand module includes a rotating motor and a soft mechanical hand assembly; the soft mechanical hand assembly includes an index finger assembly, a thumb assembly, a soft cushion and the like; and a first sensor and a second sensor are arranged on surfaces of an index finger end joint, a thumb end joint and the soft cushion. According to the present invention, the flexible robotic arm module can accurately control the position and direction to realize efficient and large-scale phenotype detection.

9 Claims, 25 Drawing Sheets

(56) References Cited

U.S. PATENT DOCUMENTS

| 12,337,472 | B1 * | 6/2025 | Xu | B25J 13/084 |
|---|---|---|---|---|
| 12,358,150 | B2 * | 7/2025 | Kim | B25J 9/1697 |
| 2011/0241368 | A1 * | 10/2011 | Kurita | B25J 15/0009 |
| | | | | 700/254 |
| 2022/0105645 | A1 * | 4/2022 | Shannon | H05K 1/0346 |
| 2024/0116192 | A1 * | 4/2024 | Bicchi | B25J 9/163 |
| 2026/0041038 | A1 * | 2/2026 | Li | A01D 46/30 |

* cited by examiner (a)

(b)

3026

3027

3026

3027

A

RIGID-FLEXIBLE COUPLING ROBOTIC ARM TYPE MEASUREMENT PLATFORM AND METHOD FOR PLANT PHENOTYPE INFORMATION

CROSS REFERENCE OF RELATED APPLICATION

This patent application claims the benefit of and priority to Chinese Patent Application No. 202410588322.6, filed with the China National Intellectual Property Administration on May 13, 2024, the disclosure of which is incorporated by reference herein in its entirety as part of the present application.

FIELD OF THE INVENTION

The present invention belongs to the technical field of measurement, and specifically relates to a rigid-flexible coupling robotic arm type measurement platform and method for plant phenotype information. The platform and the method are suitable for measuring phenotype information of different kinds of plants, and realizing nondestructive, accurate and automatic measurement for plant organs and phenotypes of the whole plant.

BACKGROUND OF THE INVENTION

Researches on plant phenotype have important theoretical significance and application value. By collecting, analyzing and describing plant phenotype information, the plant growth, development, environmental adaptability, yield, quality and the like can be comprehensively assessed. Traditionally, the plant phenotype information has been acquired manually. When measuring the thickness of leaves, it is needed to use a microscope to observe a slice and measure the thickness. When measuring the diameter of branches of trees and side branches of crops, it is needed to use a vernier caliper to read the number. When measuring the diameter of trunks of trees and stems of crops, a special measuring tape is needed. When measuring the crown breadth, a straight ruler is needed. Manual measurement of the plant phenotype information has low efficiency, large error and high damage, and cannot meet the needs of research on the plant phenotype information. The continuously updated sensor technology facilitates and develops the acquisition of the plant phenotypic information. A measurement platform for plant phenotype information is a technology platform through which plant phenotype data can be quickly and efficiently acquired, analyzed and managed, and it has the characteristics of high throughput, high precision and automation.

Common rigid sensors mounted in the measurement platform for plant phenotype information cannot perform elastic deformation, and have the shortcomings of large volume, low interaction, poor adaptability to different terrain environments, and high damage to plants. Because they are incompatible with the plants, the plants cannot grow normally. When attaching to the plant leaves or stems, they may cause damage to the plants. In addition, when a rigid invasive sensor is used for detecting, it makes direct contact with biological tissues, and the mechanical stress may affect the performance of the sensor, easily resulting in data distortion. Therefore, the traditional rigid measurement platform for plant phenotype information cannot perform accurate, non-destructive and continuous measurement on the plant phenotype information.

A robotic arm type measurement platform for plant phenotype information is a tool for researching plant growth and development, and a robotic arm system is utilized in the platform to measure and record various morphological and structural parameters of the plants, which helps to optimize production and further research an association between genotype and phenotype. Compared with other measurement platforms for plant phenotype information, the robotic arm type measurement platform for plant phenotype information utilizes the robotic arm system to measure, and can capture the growth data of the plants in a three-dimensional space, so it provides more comprehensive and accurate information than traditional two-dimensional image analysis. In addition, the robotic arm type platform usually has a high degree of automation, and can perform large-scale plant measurement with unmanned operation or little human intervention, thus improving the efficiency of data acquisition. With the precise control of the robotic arm system, accurate plant phenotypic data can be provided, which is very useful for researching small changes and dynamic processes of the plants. Moreover, the robotic arm type measurement platform for plant phenotype information is usually designed with great flexibility and can be applied to different kinds of plants. The robotic arm type measurement platform for plant phenotype information has the characteristic of high automation, and is used for researching the growth and development of the plants in depth, and promoting progress in the field of agriculture and forestry.

SUMMARY OF THE INVENTION

For overcoming the defects in related technology, the present invention provides a rigid-flexible coupling robotic arm type measurement platform for plant phenotype information, which can perform accurate, nondestructive and automatic measurement on the plant phenotype information.

In addition, for overcoming the defects in related technology, the present invention provides a rigid-flexible coupling robotic arm type measurement method for plant phenotype information, which can perform accurate, nondestructive and automatic measurement on the plant phenotype information.

In order to achieve the above technical objective, the following technical solution is adopted in the present invention.

A rigid-flexible coupling robotic arm type measurement platform for plant phenotype information includes a controller, a crawler walking module 100, a flexible robotic arm module 200 and a soft mechanical hand module 300;

the crawler walking module 100 includes a crawler walking device 101, and a robotic arm rotating base 102 which is configured to drive the flexible robotic arm module 200 to rotate; the crawler walking device 101 is connected to the flexible robotic arm module 200 by means of the robotic arm rotating base 102; and the flexible robotic arm module 200 is connected to the soft mechanical hand module 300;

the soft mechanical hand module 300 includes a rotating motor 301 and a soft mechanical hand assembly; the soft mechanical hand assembly includes an index finger assembly 302, a thumb assembly 303, a soft cushion 304 and a first connecting seat 305;

the index finger assembly 302 includes an automatic index finger telescopic arm, an index finger connecting joint 3021 and an index finger end joint 3022; an end of the automatic index finger telescopic arm is rotationally connected to the index finger connecting joint 3021, and a first driving mechanism 3023 for driving the index finger connecting joint 3021 to rotate is arranged on the automatic index finger telescopic arm; and the index finger connecting joint 3021 is rotationally connected to the index finger end joint 3022, and a second driving mechanism 3024 for driving the index finger end joint 3022 to rotate is arranged on the index finger connecting joint 3021;

the thumb assembly 303 includes an automatic thumb telescopic arm, a thumb connecting joint 3031 and a thumb end joint 3032; an end of the automatic thumb telescopic arm is rotationally connected to the thumb connecting joint 3031, and a third driving mechanism 3033 for driving the thumb connecting joint 3031 to rotate is arranged on the automatic thumb telescopic arm; and the thumb connecting joint 3031 is rotationally connected to the thumb end joint 3032, and a fourth driving mechanism 3034 for driving the thumb end joint 3032 to rotate is arranged on the thumb connecting joint 3031;

an output end of the rotating motor 301 is connected to the first connecting seat 305; the first connecting seat 305 is connected to the automatic index finger telescopic arm and the automatic thumb telescopic arm simultaneously; and the soft cushion 304 is connected between the automatic index finger telescopic arm and the automatic thumb telescopic arm;

the index finger end joint 3022 and the thumb end joint 3032 are all made of flexible materials;

a first sensor and a second sensor are arranged on surfaces of the index finger end joint 3022, the thumb end joint 3032 and the soft cushion 304; the first sensor and the second sensor are both electrically connected to the controller; and the controller is electrically connected to the fifth driving mechanism 1021 in the robotic arm rotating base 102, the sixth driving mechanism 3025 in the automatic index finger telescopic arm, and the sixth driving mechanism 3025, the first driving mechanism 3023, the second driving mechanism 3024, the third driving mechanism 3033 and the fourth driving mechanism 3034 in the automatic thumb telescopic arm simultaneously;

the first sensor is configured to detect whether it makes contact with a surface of a plant or not and transmit a signal to the controller, the second sensor is configured to detect the distance and transmit a signal to the controller, and the controller is configured to control the fifth driving mechanism 1021 in the robotic arm rotating base 102, the sixth driving mechanism 3025 in the automatic index finger telescopic arm, and the sixth driving mechanism 3025, the first driving mechanism 3023, the second driving mechanism 3024, the third driving mechanism 3033 and the fourth driving mechanism 3034 in the automatic thumb telescopic arm to work.

According to the rigid-flexible coupling robotic arm type measurement platform, the robotic arm rotating base 102 includes a fifth driving mechanism 1021, a first harmonic reducer 1022, a connecting shaft 1023, a first elastic coupling 1024, a robotic arm bottom transmission shaft 1025, a first spline 1026, a spur gear shaft 1027, a second bearing 1028, a first bearing 1029, an inner gear ring 1030, a robotic arm fixing base 1031, a rotating seat 1032 and a base cover plate 1033;

an output shaft of the fifth driving mechanism 1021 is connected to the first harmonic reducer 1022; the first harmonic reducer 1022 is connected to the connecting shaft 1023; the connecting shaft 1023 is connected to the robotic arm bottom transmission shaft 1025 by means of the first elastic coupling 1024; the robotic arm bottom transmission shaft 1025 is connected to the spur gear shaft 1027 by means of the first spline 1026; the spur gear shaft 1027 passes through a through hole in a bottom part of the robotic arm fixing base 1031 and then is rotationally connected to the robotic arm fixing base 1031 by means of the second bearing 1028; the spur gear shaft 1027 is meshed with the inner gear ring 1030; the inner gear ring 1030 is fixedly connected to the rotating seat 1032; the rotating seat 1032 is rotationally connected to the robotic arm fixing base 1031 by means of the first bearing 1029, and a top part of the rotating seat 1032 is positioned on an outer side of a through hole in a top part of the robotic arm fixing base 1031; the bottom part of the robotic arm fixing base 1031 is connected to the base cover plate 1033 by means of bolts; and the base cover plate 1033 and the fifth driving mechanism 1021 are both connected to the crawler walking device 101 by means of bolts.

According to the rigid-flexible coupling robotic arm type measurement platform, the flexible robotic arm module 200 includes a first arm rod 201 of the robotic arm, a second arm rod 202 of the robotic arm, an end arm rod 203 of the robotic arm and flexible joints 204 of the robotic arm, the robotic arm rotating base 102 is connected to the first arm rod 201 of the robotic arm by means of a flexible joint 204 of the robotic arm, the first arm rod 201 of the robotic arm is connected to the second arm rod 202 of the robotic arm by means of a flexible joint 204 of the robotic arm, the second arm rod 202 of the robotic arm is connected to the end arm rod 203 of the robotic arm by means of a flexible joint 204 of the robotic arm, and the end arm rod 203 of the robotic arm is connected to a rotating motor 301 by means of a second connecting seat 205;

the flexible joint 204 of the robotic arm includes a seventh driving mechanism 2041, a motor box 2042, a second harmonic reducer 2043, a flexible joint output shaft 2044, a third bearing 2045, a second elastic coupler 2046, a first spring connecting seat 2047, a spring 2048, a second spring connecting seat 2056, a second spline 2049, a connecting member 2050 and a joint housing 2051;

the seventh driving mechanism 2041 is connected into the motor box 2042 by means of bolts; an output shaft of the seventh driving mechanism 2041 is connected to the flexible joint output shaft 2044 by means of the second harmonic reducer 2043; the flexible joint output shaft 2044 is rotationally connected to the motor box 2042 through the third bearing 2045; the other end of the flexible joint output shaft 2044 extends outwards from a reserved hole in a rear end of the motor box 2042 and then is connected to the first spring connecting seat 2047 by means of the second elastic coupling 2046; the two ends of the spring (torsional spring) 2048 are connected to the first spring connecting seat 2047 and the second spring connecting seat 2056 respectively; the second spring connecting seat 2056 is connected to the connecting member 2050 by means of the second spline 2049; the connecting member 2050 is connected to the joint housing 2051 by means of bolts; and the second elastic coupling 2046, the first spring connecting seat 2047 and the second spring connecting seat 2056 are all located in an inner hole in the joint housing 2051;

the motor box 2042 is connected to the robotic arm rotating base 102, the first arm rod 201 of the robotic arm or the second arm rod 202 of the robotic arm; and the joint housing 2051 is connected to the first arm rod 201 of the robotic arm, the second arm rod 202 of the robotic arm or the end arm rod 203 of the robotic arm;

the seventh driving mechanism 2041 is electrically connected to the controller.

According to the rigid-flexible coupling robotic arm type measurement platform, the flexible joint 204 of the robotic arm further includes an oil seal 2052, a bearing end cover 2053 and a joint end cover 2054; the bearing end cover 2053 is connected to a rear end of the motor box 2042 by means of bolts, a rear end of the bearing end cover 2053 is located in the inner hole in the joint housing 2051, and the oil seal 2052 is arranged between the bearing end cover 2053 and an inner wall of the joint housing 2051; and a top part of the motor box 2042 is connected to a motor cover 2055 by means of bolts;

the seventh driving mechanism 2041 is a servo motor.

According to the rigid-flexible coupling robotic arm type measurement platform, the automatic thumb telescopic arm and the automatic index finger telescopic arm are the same in structure, each of the automatic thumb telescopic arm and the automatic index finger telescopic arm includes a sixth driving mechanism 3025, a first telescopic arm section 3026, a second telescopic arm section 3027, a telescopic arm rack 3028 and a transmission gear 3029; the sixth driving mechanism 3025 is connected to the second telescopic arm section 3027; an output shaft of the sixth driving mechanism 3025 is connected to the transmission gear 3029; the transmission gear 3029 is meshed with the telescopic arm rack 3028; the telescopic arm rack 3028 is connected to the first telescopic arm section 3026; one end of the second telescopic arm section 3027 is located on an inner side of the first telescopic arm section 3026, and the second telescopic arm section 3027 and the first telescopic arm section 3026 are connected in a sliding mode by means of a sliding rail 3030;

the first telescopic arm section 3026 and the second telescopic arm section 3027 are made of rigid materials.

According to the rigid-flexible coupling robotic arm type measurement platform, the first driving mechanism 3023 is connected to the automatic index finger telescopic arm, and an output end of the first driving mechanism 3023 is connected onto the index finger connecting joint 3021, the second driving mechanism 3024 is connected onto the index finger connecting joint 3021, and an output end of the second driving mechanism 3024 is connected to the index finger end joint 3022;

the third driving mechanism 3033 is connected onto the automatic thumb telescopic arm, and an output end of the third driving mechanism 3033 is connected to the thumb connecting joint 3031; the fourth driving mechanism 3034 is connected onto the thumb connecting joint 3031, and an output end of the fourth driving mechanism 3034 is connected to the thumb end joint 3032;

the index finger connecting joint 3021 and the thumb connecting joint 3031 are all made of flexible materials.

According to the rigid-flexible coupling robotic arm type measurement platform, the first driving mechanism 3023, the second driving mechanism 3024, the third driving mechanism 3033, the fourth driving mechanism 3034 and the sixth driving mechanism 3025 are stepping motors; and the fifth driving mechanism 1021 is a servo motor.

According to the rigid-flexible coupling robotic arm type measurement platform, the first sensors are fiber bragg grating sensors and are arranged at a fingertip of the index finger end joint 3022, a fingertip of the thumb end joint 3032 and the soft cushion 304;

the second sensors include a self-inductive sensor and metal objects (metal sheets); the self-inductive sensor is arranged at the fingertip of the index finger end joint 3022; and the metal objects are arranged on the fingertip of the thumb end joint 3032 and the soft cushion 304.

A measurement method of the rigid-flexible coupling robotic arm type measurement platform, includes that:

an image acquisition module acquires image information of a trunk to be measured and transmits the image information to a controller, the controller determines the position of a target to be measured according to the image information, and controls a fifth driving mechanism 1021 in a robotic arm rotating base 102 to act so as to make a soft mechanical hand module 300 to face the target to be measured, and the controller controls seventh driving mechanisms 2041 in a plurality of robotic arm flexible joints 204 in a flexible robotic arm module 200 to act so as to make a soft mechanical hand module 300 to move towards the position of the target to be measured;

if the target to be measured is a leaf, the controller controls a first driving mechanism 3023, a second driving mechanism 3024, a third driving mechanism 3033 and a fourth driving mechanism 3034 in the soft mechanical hand module 300 to act respectively, and then controls an index finger connecting joint 3021, an index finger end joint 3022, a thumb connecting joint 3031 and a thumb end joint 3032 to rotate respectively until a surface of the leaf to be measured is clamped by a fingertip of the index finger end joint 3022 and a fingertip of the thumb end joint 3032; when a fiber bragg grating sensor at the fingertip of the index finger end joint 3022 and a fiber bragg grating sensor at the fingertip of the thumb end joint 3032 touch the surface of the leaf to be measured, the fiber bragg grating sensors will transmit signals to the controller, then the controller controls the first driving mechanism 3023, the second driving mechanism 3024, the third driving mechanism 3033 and the fourth driving mechanism 3034 to stop acting, at the moment, a self-inductive sensor at the fingertip of the index finger end joint 3022 will detect a metal object at the fingertip of the thumb end joint 3032 and transmits a signal to the controller, thus measuring and obtaining the thickness of the surface of the blade to be measured;

if the target to be measured is branches of trees or side branches of crops, the controller controls the first driving mechanism 3023 and the second driving mechanism 3024 in the soft mechanical hand module 300 to act respectively, and then controls the index finger connecting joint 3021 and the index finger end joint 3022 to rotate respectively until the index finger connecting joint 3021 and the index finger end joint 3022 surround the target to be measured; when a fiber bragg grating sensor on the soft cushion 304 and the fiber bragg grating sensor at the fingertip of the index finger end joint 3022 touch the target to be measured, the fiber bragg grating sensors will transmit signals to the controller, then the controller controls the first driving mechanism 3023 and the second driving mechanism 3024 to stop acting, and at the moment, the self-inductive sensor at the fingertip of the index finger end joint 3022 will detect the metal object on the soft cushion 304 and transmit a signal to the controller, thus measuring and obtaining the diameter of the target to be measured;

if the target to be measured is a trunks of trees and stems of crops, the controller controls the first driving mechanism 3023, the second driving mechanism 3024, the third driving mechanism 3033 and the fourth driving mechanism 3034 in the soft mechanical hand module 300 to act respectively, and then controls the index finger connecting joint 3021, the index finger end joint 3022, the thumb connecting joint 3031 and the thumb end joint 3032 to rotate respectively until the target to be measured is clamped by the fingertip of the index finger end joint 3022 and the fingertip of the thumb end joint 3032; when the fiber bragg grating sensor at the fingertip of the index finger end joint 3022 and the fiber bragg grating sensor at the fingertip of the thumb end joint 3032 touch the target to be measured, the fiber bragg grating sensors will transmit signals to the controller, then the controller controls the first driving mechanism 3023, the second driving mechanism 3024, the third driving mechanism 3033 and the fourth driving mechanism 3034 to stop acting, at the moment, the self-inductive sensor at the fingertip of the index finger end joint 3022 will detect the metal object at the fingertip of the thumb end joint 3032 and transmit a signal to the controller, thus measuring and obtaining the diameter of the target to be measured;

if the target to be measured is crown breadth, the controller controls sixth driving mechanisms 3025 in the automatic thumb telescopic arm and the automatic index finger telescopic arm in the soft mechanical hand module 300 to act respectively, and the automatic thumb telescopic arm and the automatic index finger telescopic arm will stretch; the controller controls the first driving mechanism 3023, the second driving mechanism 3024, the third driving mechanism 3033 and the fourth driving mechanism 3034 to act respectively, and then controls the index finger connecting joint 3021, the index finger end joint 3022, the thumb connecting joint 3031 and the thumb end joint 3032 to rotate respectively until the index finger connecting joint 3021, the index finger end joint 3022, the thumb connecting joint 3031 and the thumb end joint 3032 envelop the target to be measured; when the fiber bragg grating sensor at the fingertip of the index finger end joint 3022 and the fiber bragg grating sensor at the fingertip of the thumb end joint 3032 touch the target to be measured, the fiber bragg grating sensors will transmit signals to the controller, and then the controller controls the first driving mechanism 3023, the second driving mechanism 3024, the third driving mechanism 3033 and the fourth driving mechanism 3034 to stop acting, at the moment, the self-inductive sensor at the fingertip of the index finger end joint 3022 will measure the metal object at the fingertip of the thumb end joint 3032 and transmit a signal to the controller, thus measuring and obtaining the crown breadth of the target to be measured.

In order to solve the problems in the related technology, the present invention provides a rigid-flexible coupling based measurement platform for plant phenotype information. A flexible robotic arm module can freely move to collect the phenotype information of a plurality of varieties of plants in a plurality of growth period. Because a rigid measurement tool may cause irreversible damage to leaves and stalks of the plants, the flexible robotic arm module and a soft mechanical hand module are designed to realize nondestructive measurement of the plant phenotype information. The flexible robotic arm module can provide accurate positioning to prevent a robotic arm from large vibration during moving, thus reducing the damage caused by vibration to the plants during measurement. A soft index finger joint and a soft thumb joint are matched with an automatic telescopic arm, thus for different measurement targets and parameters to be measured, the soft mechanical hand module can utilize different fingers and combinations to perform measurement on the thickness of the leaves, measurement on the diameter of long and thin targets such as the branches of the trees and the side branches of the crops, measurement on the diameter of thick and big targets such as the trunks of the trees and the stems of the crops, and measurement on the crown breadth, thereby acquiring the plant phenotype information. Moreover, the soft index finger joint and the soft thumb joint are made of flexible materials and cannot damage the plants during measuring. The present invention provides the rigid-flexible coupling type measurement platform for plant phenotype information, which can perform accurate, nondestructive and automatic measurement.

According to the measurement platform provided by the present invention, in the rigid-flexible coupling type robotic arm, flexible joints of the mechanical arm, the soft index finger joint, the thumb joint and a soft cushion are flexible parts, and arm rods of the robotic arm and the telescopic arm of a mechanical hand are rigid parts. The flexible parts and the rigid parts act together to form a rigid-flexible coupling type robotic arm structure, and the rigid-flexible coupling type robotic arm structure integrates the advantages of good flexibility of the flexible materials and high hardness of rigid materials and can perform nondestructive, accurate and automatic measurement on plant organs and phenotypes of the whole plant. In the present invention, a crawler walking module is capable of performing movement in various complex terrains, so it has high adaptability and stability. The flexible joints of the robotic arm are mainly damped through a spring device, so that the control precision of the robotic arm can be improved, an end can be greatly prevented from shaking in a large range when the robotic arm moves, and moreover, the positioning precision of the robotic arm is improved. By stretching the telescopic arm, the measurement range of the soft mechanical hand can be expanded, and the measurement can be performed in a seedling stage and a mature stage of the plants, so that the universality is realized. In the present invention, by utilizing a rigid-flexible coupling mode, the crawler walking module, the flexible robotic arm module and the soft mechanical hand module are integrated, thus moving in different terrains is realized, and high-precision, nondestructive and automatic phenotype information measurement can be performed on different kinds of plants.

The platform integrates the advantages of good flexibility of the flexible materials and high hardness of the rigid materials, the soft mechanical hand connected through a rigid framework is designed, the flexible joints of the mechanical arms are utilized to realize accurate movement and positioning, therefore, the limitation of poor self-adaptation of a traditional rigid mechanical hand is broken through, and nondestructive measurement can be performed on the plant organs and the phenotypes of the whole plant. The soft mechanical hand is in a two-finger wrapping form, and the soft mechanical hand and the sensors act together to realize nondestructive measurement of the plant phenotype information. The mechanical hand can be configured to accurately measure various morphological and structural parameters of the plants, including phenotype parameters of the plant organs (the thickness of leaves, the diameters of the branches of the trees and the side branches of the crops, the diameters of the trunks of the trees and the stems of the crops, and the like), and the phenotype parameters of the whole plant (crown breadth). These measurements are beneficial to tracking the growth and development of the plants over time, and a more flexible and more advanced tool is provided for research.

In conclusion, the technical solution provided by the present invention has the following beneficial effects:

(1) According to the designed rigid-flexible coupling type measurement platform for plant phenotype information in the present invention, the flexible robotic arm module can accurately control the position and direction to perform efficient and large-scale phenotype information detection. The flexible joints of the robotic arm are further designed to reduce the vibration generated when the robotic arm moves, thus avoiding the damage to the plants during manually collecting the plant phenotype information, and realizing high-precision and high-efficiency measurement of the plant phenotype information.

(2) The designed rigid-flexible coupling type measurement platform for plant phenotype information in the present invention integrates the advantages of good flexibility of the flexible materials and high hardness of the rigid materials, the soft mechanical hand of the flexible parts and the telescopic arm of the rigid parts are cooperated to realize accurate, automatic and non-destructive measurement on the phenotype parameters of the plant organs (such as the thickness of the leaves, the diameter of the branches of the trees, the side branches of the crops, the trunks of the trees and the stems of the crops) and the phenotype parameters of the whole plant (crown breadth).

DETAILED DESCRIPTION OF THE INVENTION

In order to make the objective and solution of the embodiments of the present invention more clear, the technical solution of the present invention is described clearly and completely below in conjunction with the accompanying drawings. The present invention is suitable for both a controlled environment and a natural environment, can work in a variety of environments such as a greenhouse or field, and is a fast, non-destructive, automatic plant phenotype information measurement platform.

A rigid-flexible coupling robotic arm type measurement platform for plant phenotype information includes a controller, a crawler walking module 100, a flexible robotic arm module 200 and a soft mechanical hand module 300.

Figure 1:
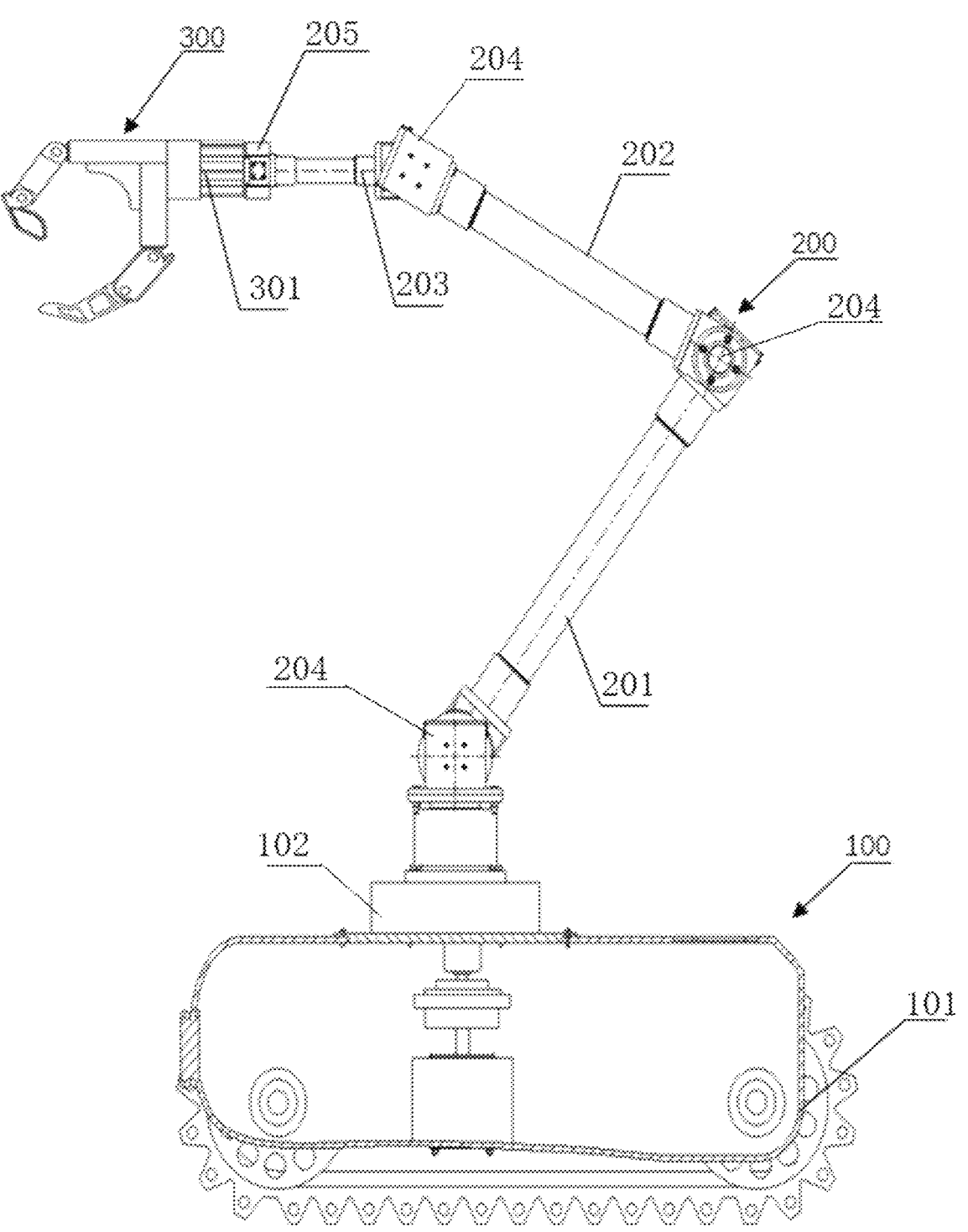
FIG. 1 is a main view of a platform.
Figure 2:
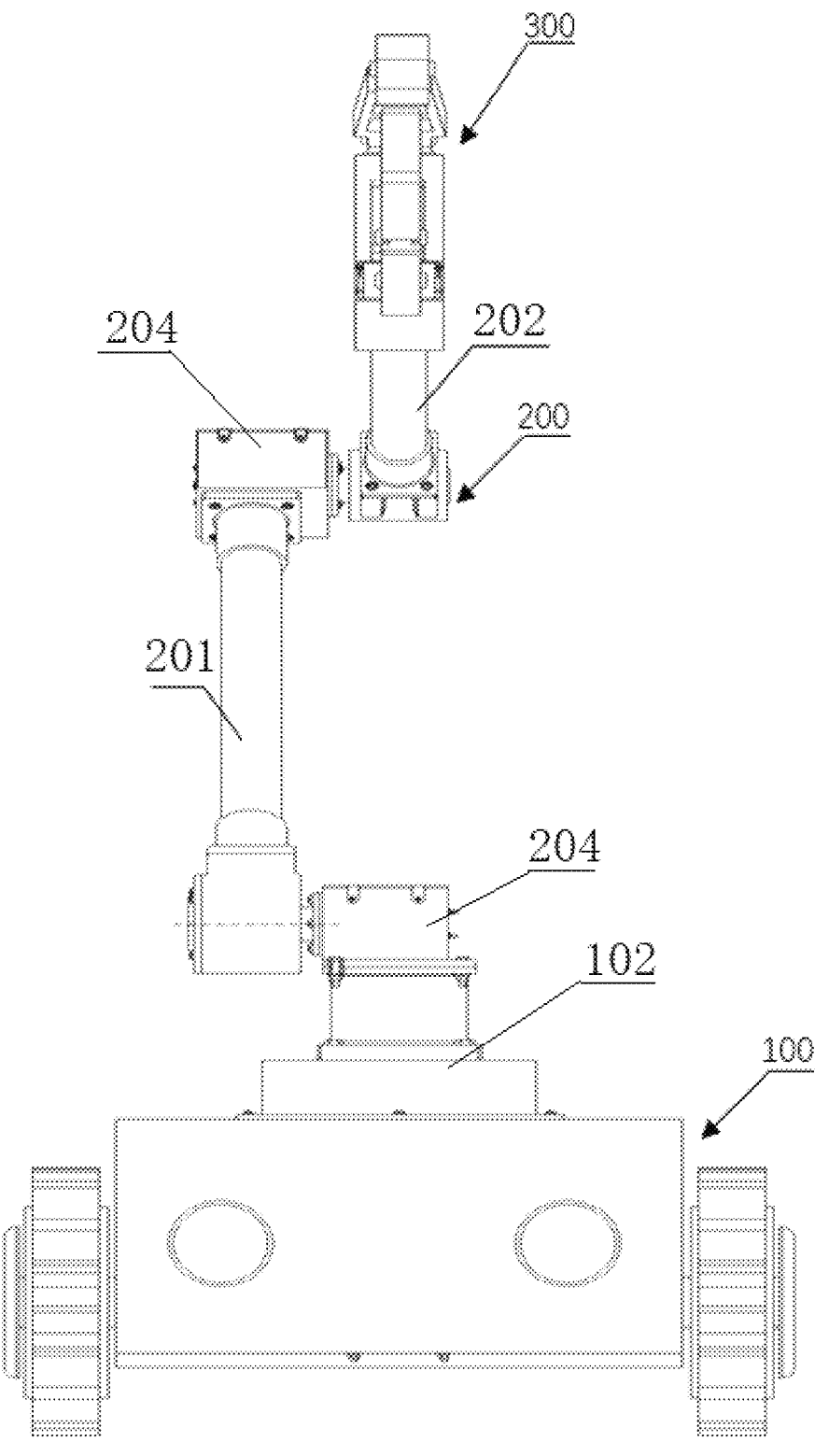
FIG. 2 is a left view of a platform.

As shown in FIG. 1 to FIG. 2, the crawler walking module 100 includes a crawler walking device 101, and a robotic arm rotating base 102 which is configured to drive the flexible robotic arm module 200 to rotate; the crawler walking device 101 is connected to the flexible robotic arm module 200 by means of the robotic arm rotating base 102; and the flexible robotic arm module 200 is connected to the soft mechanical hand module 300.

Figure 3A:
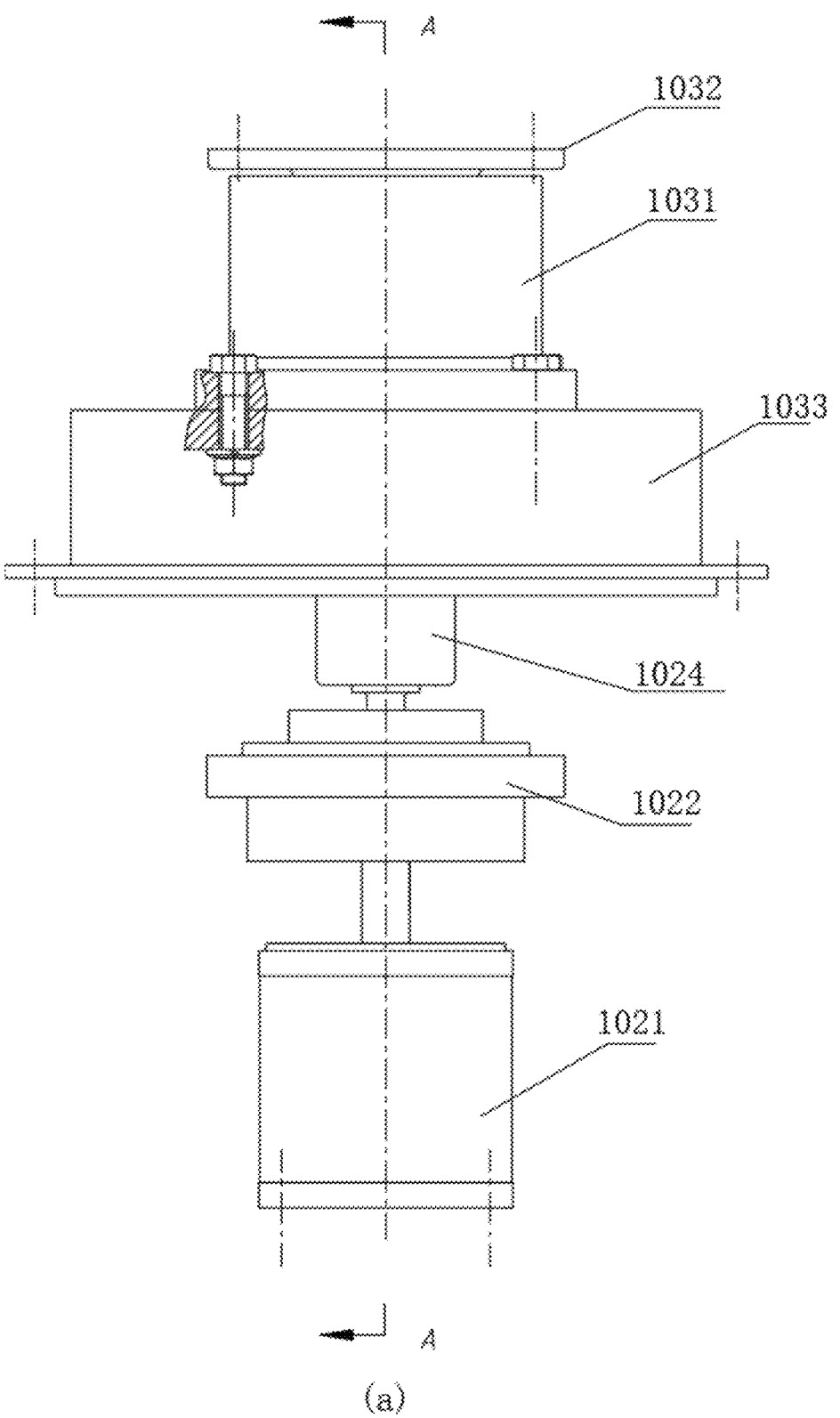
FIG. 3A is a main view of a robotic arm rotating base.
Figure 3B:
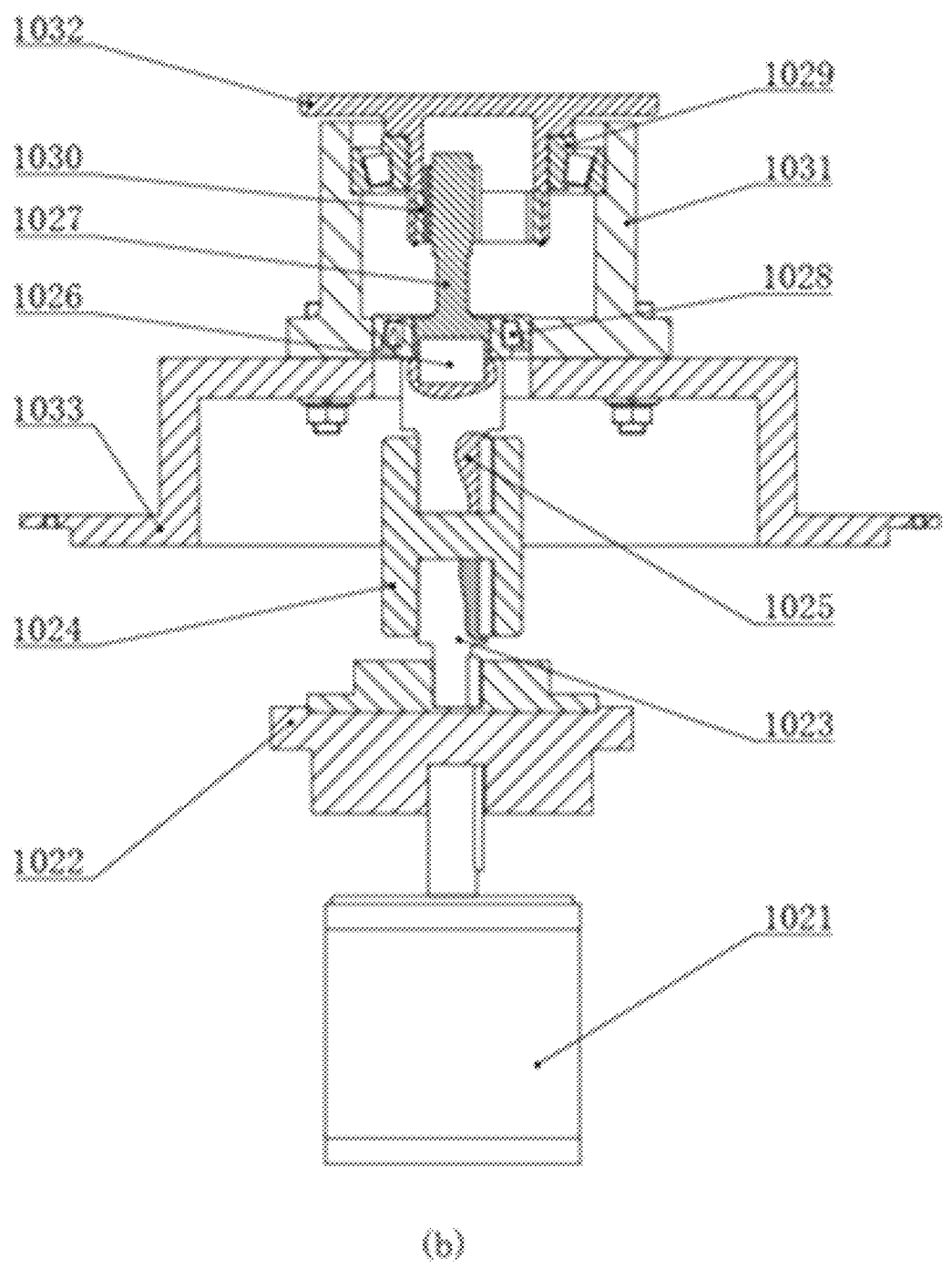
FIG. 3B is a schematic diagram of a section A-A of a robotic arm rotating base in FIG. 3A.
Figure 4:
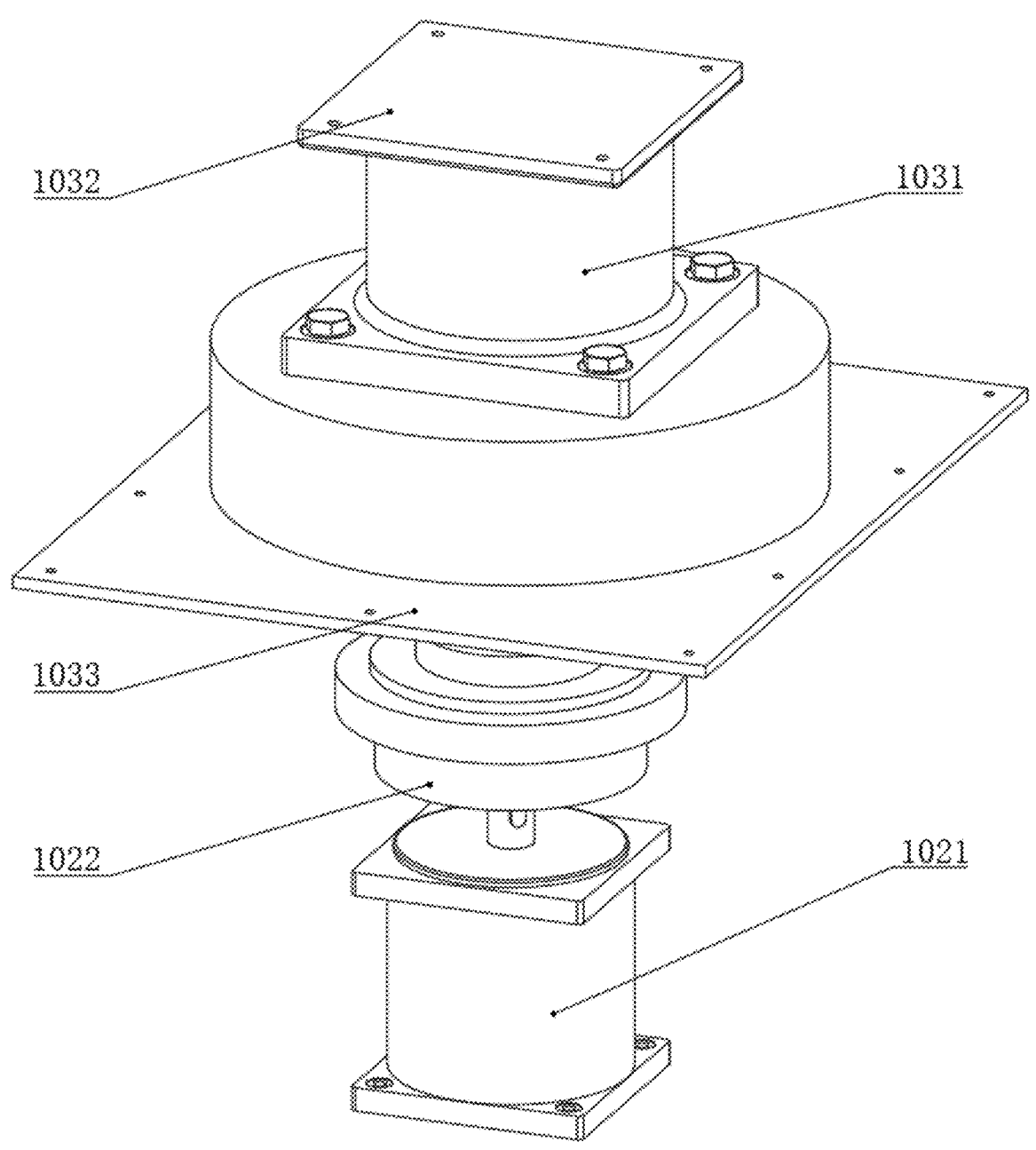
FIG. 4 is a schematic diagram of an outline of a robotic arm rotating base.

As shown in FIG. 3 to FIG. 4, the robotic arm rotating base 102 includes a fifth driving mechanism 1021, a first harmonic reducer 1022, a connecting shaft 1023, a first elastic coupling 1024, a robotic arm bottom transmission shaft 1025, a first spline 1026, a spur gear shaft 1027, a second bearing 1028, a first bearing 1029, an inner gear ring 1030, a robotic arm fixing base 1031, a rotating seat 1032 and a base cover plate 1033.

An output shaft of the fifth driving mechanism 1021 is connected to the first harmonic reducer 1022; the first harmonic reducer 1022 is connected to the connecting shaft 1023; the connecting shaft 1023 is connected to the robotic arm bottom transmission shaft 1025 by means of the first elastic coupling 1024; the robotic arm bottom transmission shaft 1025 is connected to the spur gear shaft 1027 by means of the first spline 1026; the spur gear shaft 1027 passes through a through hole in a bottom part of the robotic arm fixing base 1031 and then is rotationally connected to the robotic arm fixing base 1031 by means of the second bearing 1028; the spur gear shaft 1027 is meshed with the inner gear ring 1030; the inner gear ring 1030 is fixedly connected to the rotating seat 1032; the rotating seat 1032 is rotationally connected to the robotic arm fixing base 1031 by means of the first bearing 1029, and a top part of the rotating seat 1032 is positioned on an outer side of a through hole in a top part of the robotic arm fixing base 1031; the bottom part of the robotic arm fixing base 1031 is connected to the base cover plate 1033 by means of bolts; and the base cover plate 1033 and the fifth driving mechanism 1021 are both connected to the crawler walking device 101 by means of bolts.

The output shaft of the fifth driving mechanism 1021 is overlapped with axes of the robotic arm bottom transmission shaft 1025 and the spur gear shaft 1027. By means of the fifth driving mechanism 1021, namely, a motor rotating, the rotating seat 1032 can rotate around the axis. The rotating seat 1032 can rotate by the robotic arm rotating base 102, so that the flexible robotic arm module 200 can rotate, which facilitates multi-angle and all-direction acquisition of the plant phenotype information.

The flexible robotic arm module 200 includes a first arm rod 201 of the robotic arm, a second arm rod 202 of the robotic arm, an end arm rod 203 of the robotic arm and flexible joints 204 of the robotic arm. As shown in FIG. 1, the robotic arm rotating base 102 is connected to the first arm rod 201 of the robotic arm by means of the flexible joint 204 of the robotic arm, the first arm rod 201 of the robotic arm is connected to the second arm rod 202 of the robotic arm by means of the flexible joint 204 of the robotic arm, the second arm rod 202 of the robotic arm is connected to the end arm rod 203 of the robotic arm by means of the flexible joint 204 of the robotic arm, and the end arm rod 203 of the robotic arm is connected to a rotating motor 301 by means of a second connecting seat 205.

Figure 5:
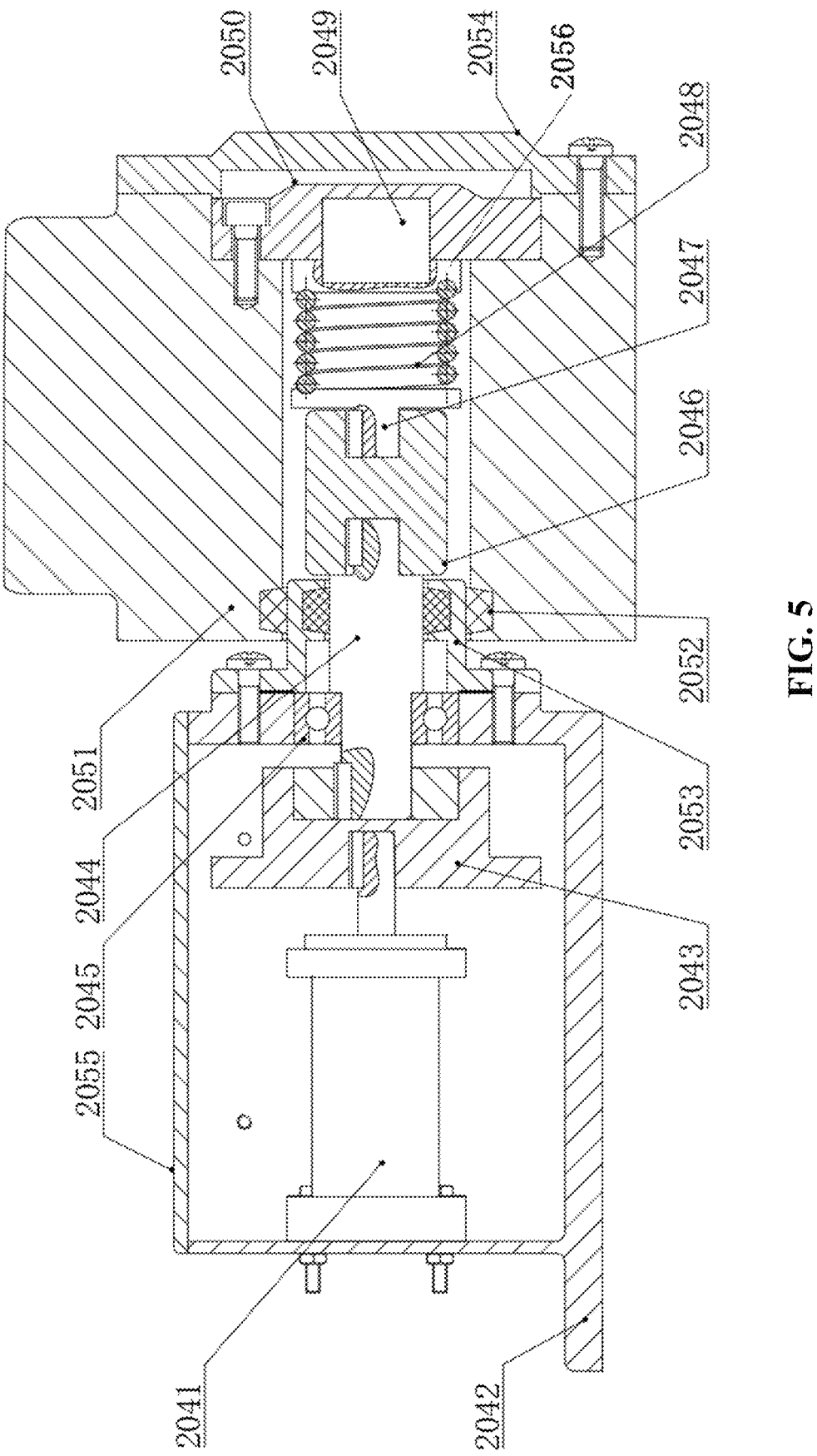
FIG. 5 is a sectional schematic diagram of a flexible joint of a robotic arm.
Figure 6:
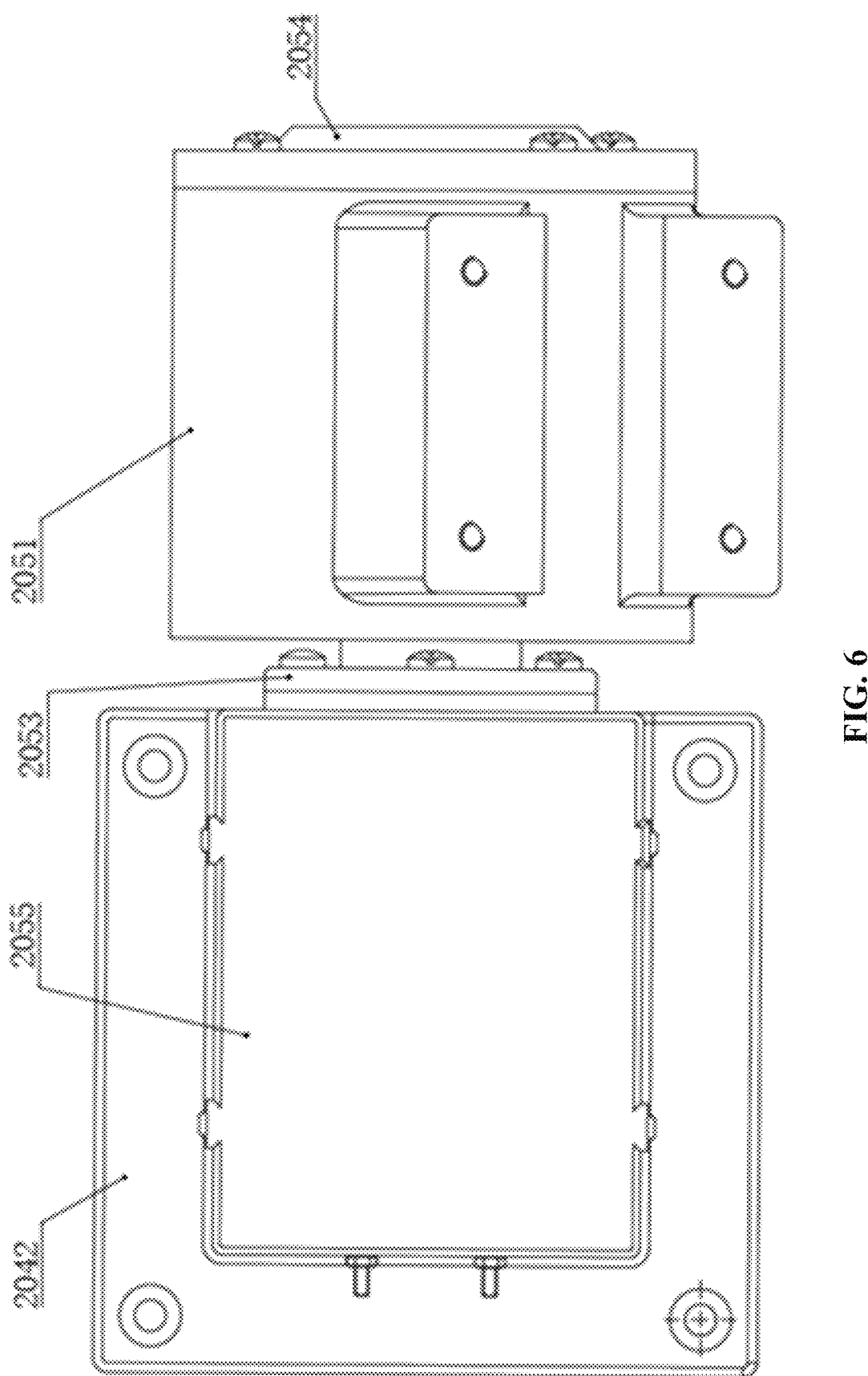
FIG. 6 is a top view of an outline of a flexible joint of a robotic arm.
Figure 7:
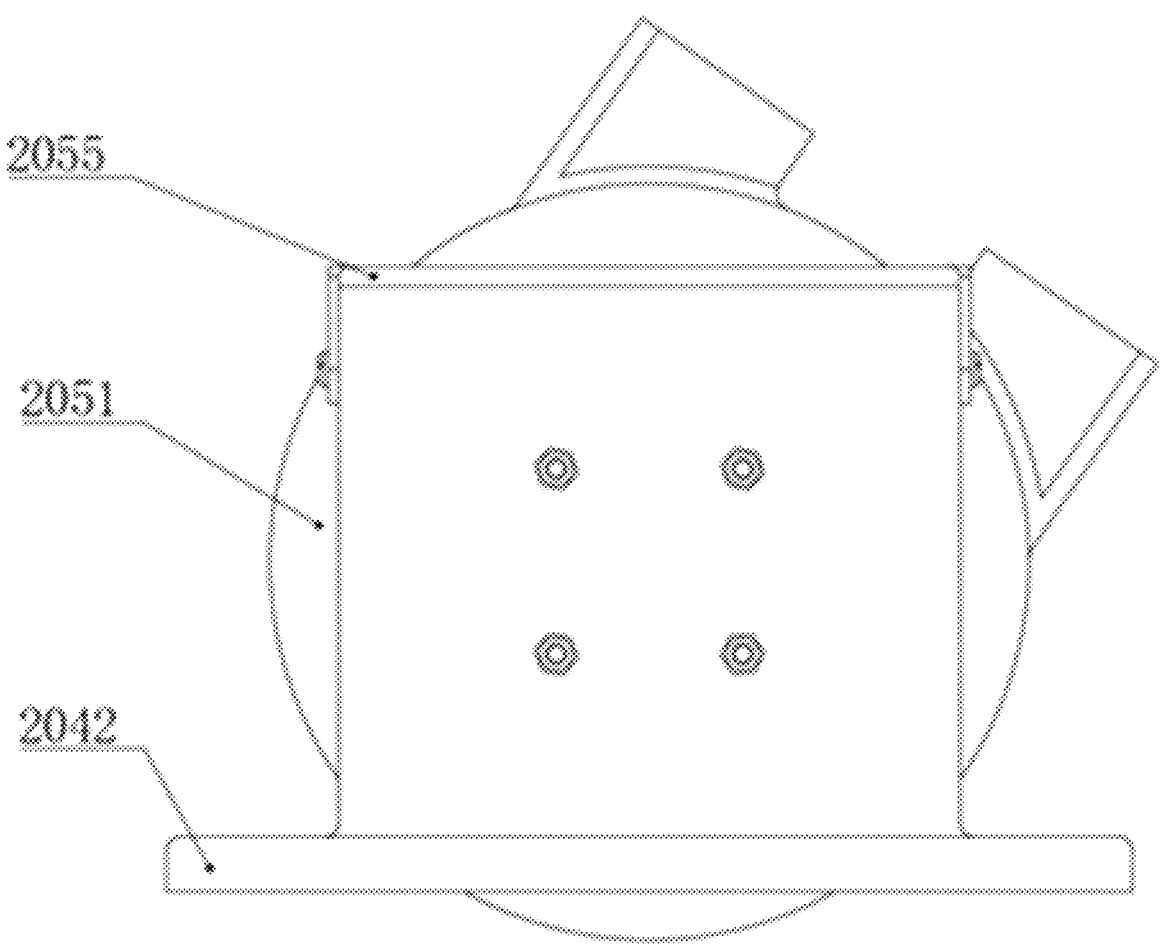
FIG. 7 is a left view of an outline of a flexible joint of a robotic arm.

As shown in FIG. 5 to FIG. 7, the flexible joint 204 of the robotic arm includes a seventh driving mechanism 2041, a motor box 2042, a second harmonic reducer 2043, a flexible joint output shaft 2044, a third bearing 2045, a second elastic coupler 2046, a first spring connecting seat 2047, a spring 2048, a second spring connecting seat 2056, a second spline 2049, a connecting member 2050 and a joint housing 2051.

The seventh driving mechanism 2041 is connected into the motor box 2042 by means of bolts; an output shaft of the seventh driving mechanism 2041 is connected to the flexible joint output shaft 2044 by means of the second harmonic reducer 2043; the flexible joint output shaft 2044 is rotationally connected to the motor box 2042 through the third bearing 2045; the other end of the flexible joint output shaft 2044 extends outwards from a reserved hole in a rear end of the motor box 2042 and then is connected to the first spring connecting seat 2047 by means of the second elastic coupling 2046; the two ends of the spring (torsional spring) 2048 are connected to the first spring connecting seat 2047 and the second spring connecting seat 2056 respectively; the spring 2048 has elasticity; the second spring connecting seat 2056 is connected to the connecting member 2050 by means of the second spline 2049; the connecting member 2050 is connected to the joint housing 2051 by means of bolts; and the second elastic coupling 2046, the first spring connecting seat 2047 and the second spring connecting seat 2056 are all located in an inner hole in the joint housing 2051. The spring (torsional spring) 2048 is mainly configured to buffer a force transmitted by the seventh driving mechanism 2041, thus reducing shaking.

The motor box 2042 is connected to the robotic arm rotating base 102, the first arm rod 201 of the robotic arm or the second arm rod 202 of the robotic arm; and the joint housing 2051 is connected to the first arm rod 201 of the robotic arm, the second arm rod 202 of the robotic arm or the end arm rod 203 of the robotic arm.

The seventh driving mechanism 2041 is electrically connected to the controller.

The flexible joint 204 of the robotic arm further includes an oil seal 2052, a bearing end cover 2053 and a joint end cover 2054; the bearing end cover 2053 is connected to a rear end of the motor box 2042 by means of bolts, a rear end of the bearing end cover 2053 is located in the inner hole in the joint housing 2051, and the oil seal 2052 is arranged between the bearing end cover 2053 and an inner wall of the joint housing 2051; and a top part of the motor box 2042 is connected to a motor cover 2055 by means of bolts.

The seventh driving mechanism 2041 is a servo motor.

Figure 8:
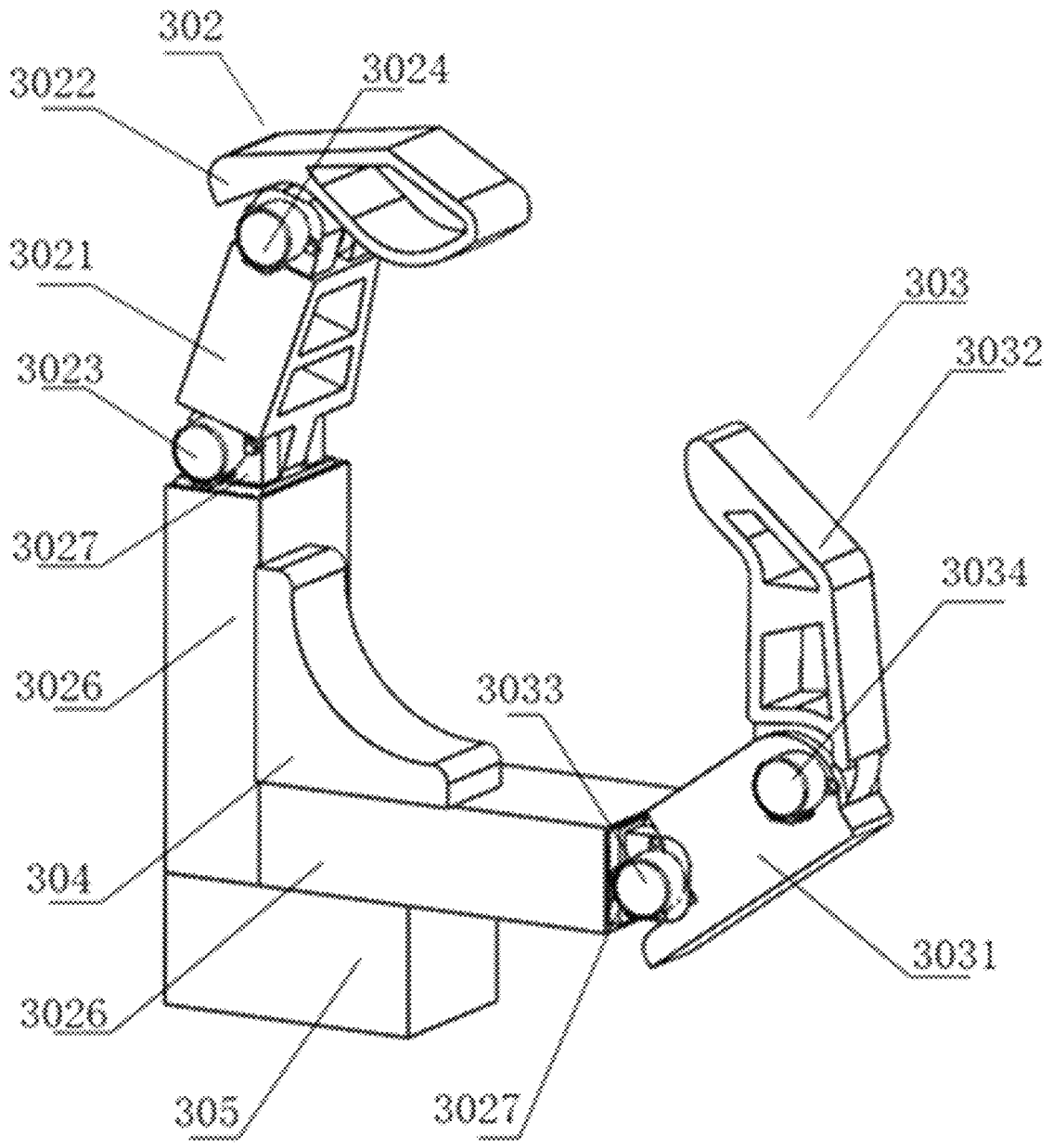
FIG. 8 is a structural schematic diagram of a soft mechanical hand module.
Figure 9:
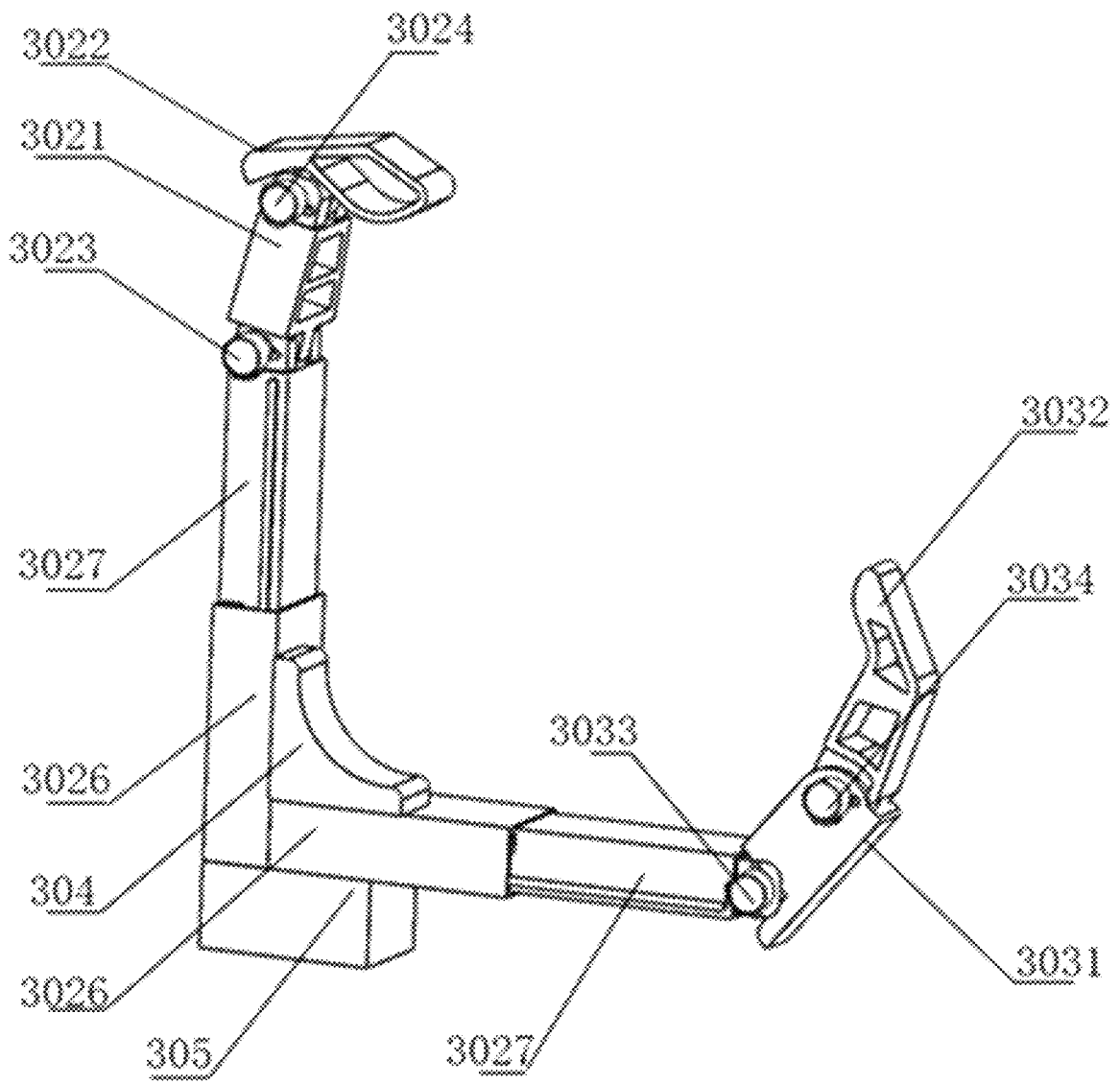
FIG. 9 is a structural schematic diagram of a soft mechanical hand module in stretching.
Figure 10:
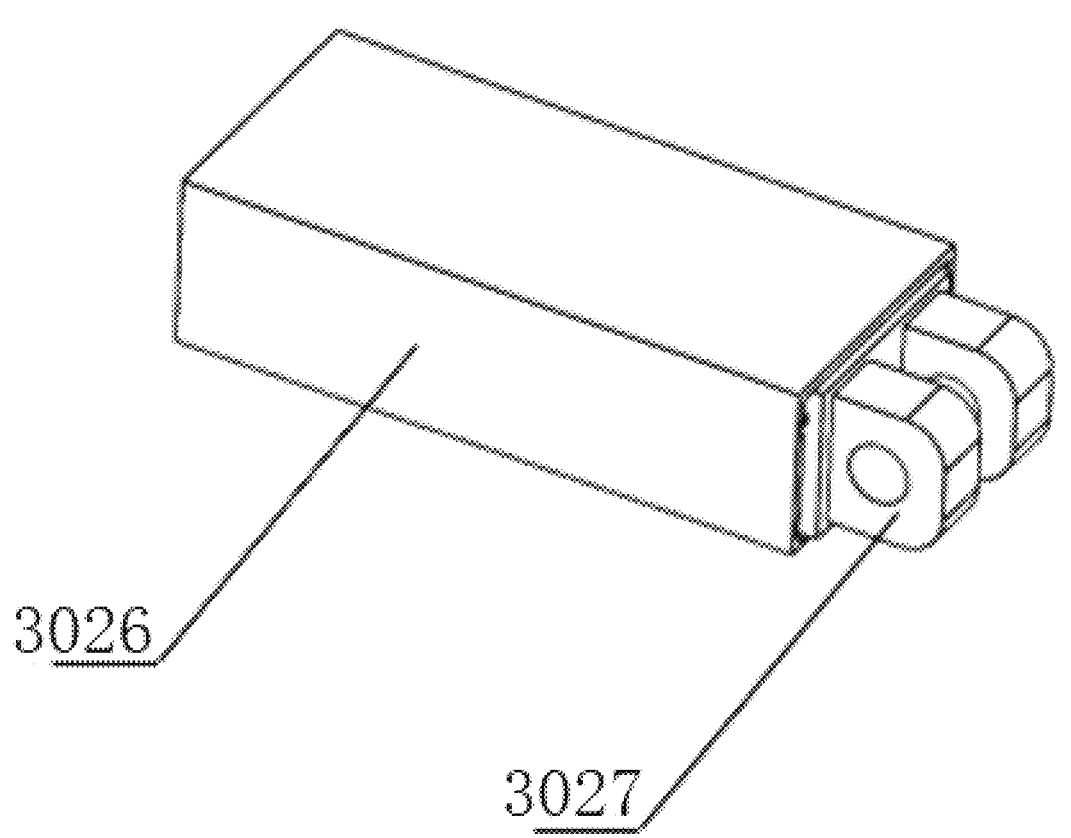
FIG. 10 is a schematic diagram of an automatic index finger telescopic arm or an automatic thumb telescopic arm in retracting.
Figure 11:
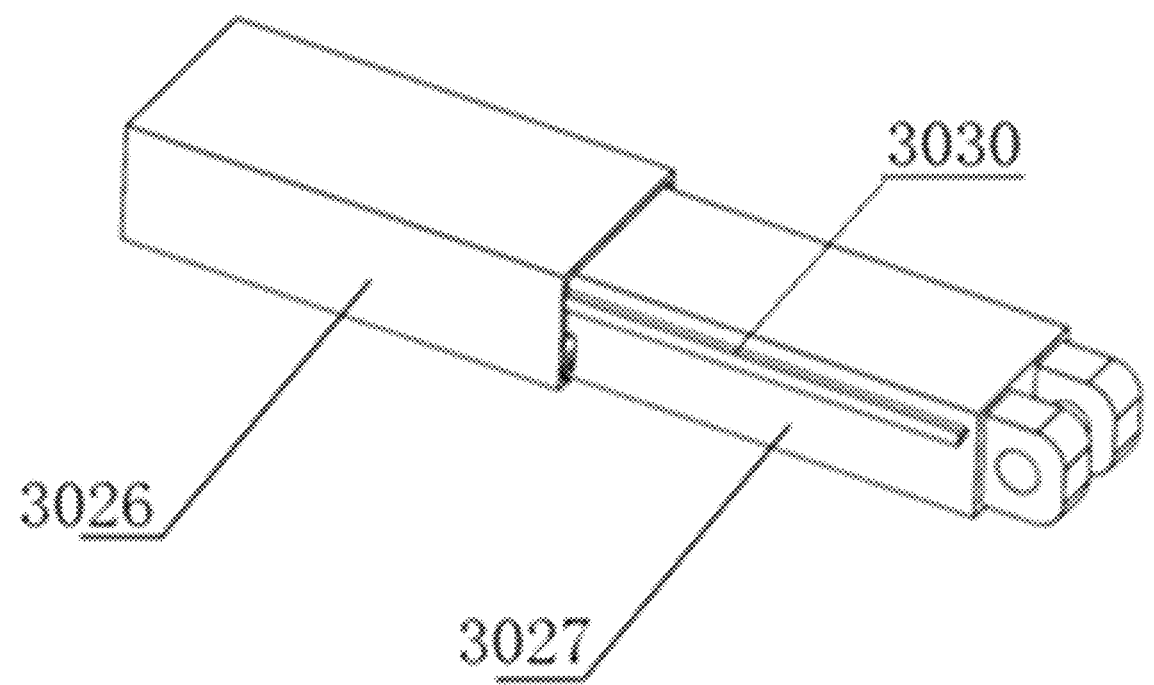
FIG. 11 is a schematic diagram of an automatic index finger telescopic arm or an automatic thumb telescopic arm in stretching.
Figure 12:
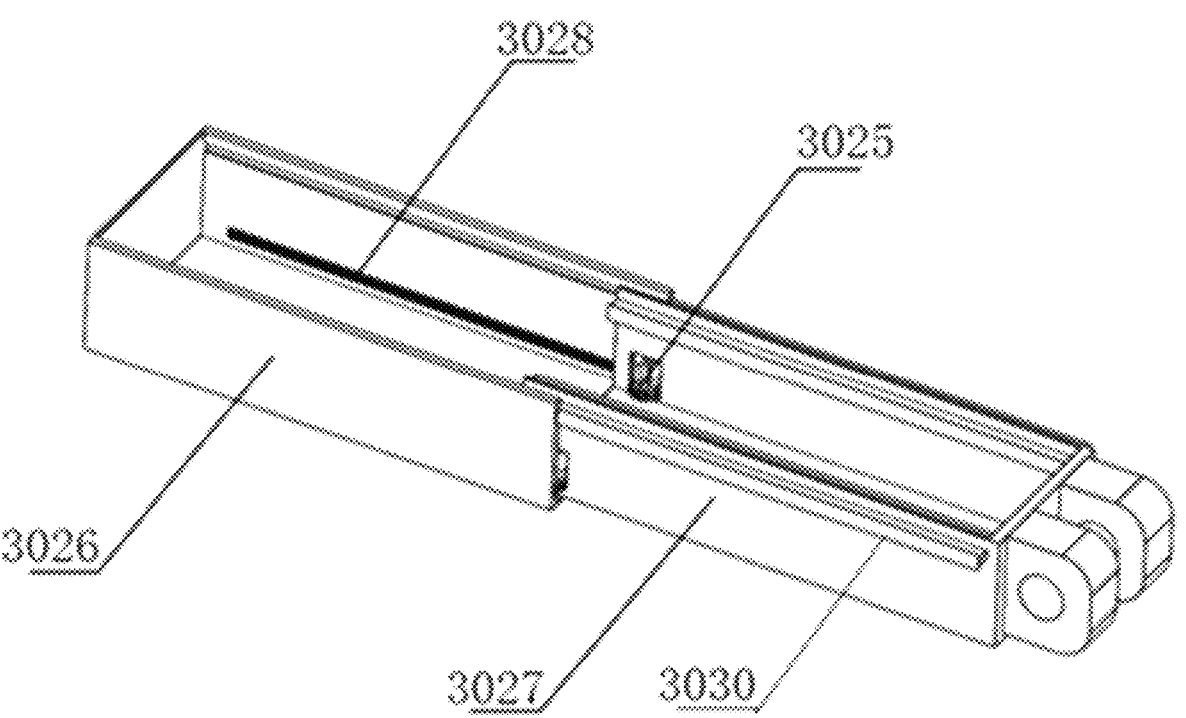
FIG. 12 is a sectional schematic section of an automatic index finger telescopic arm or an automatic thumb telescopic arm in stretching.
Figure 13:
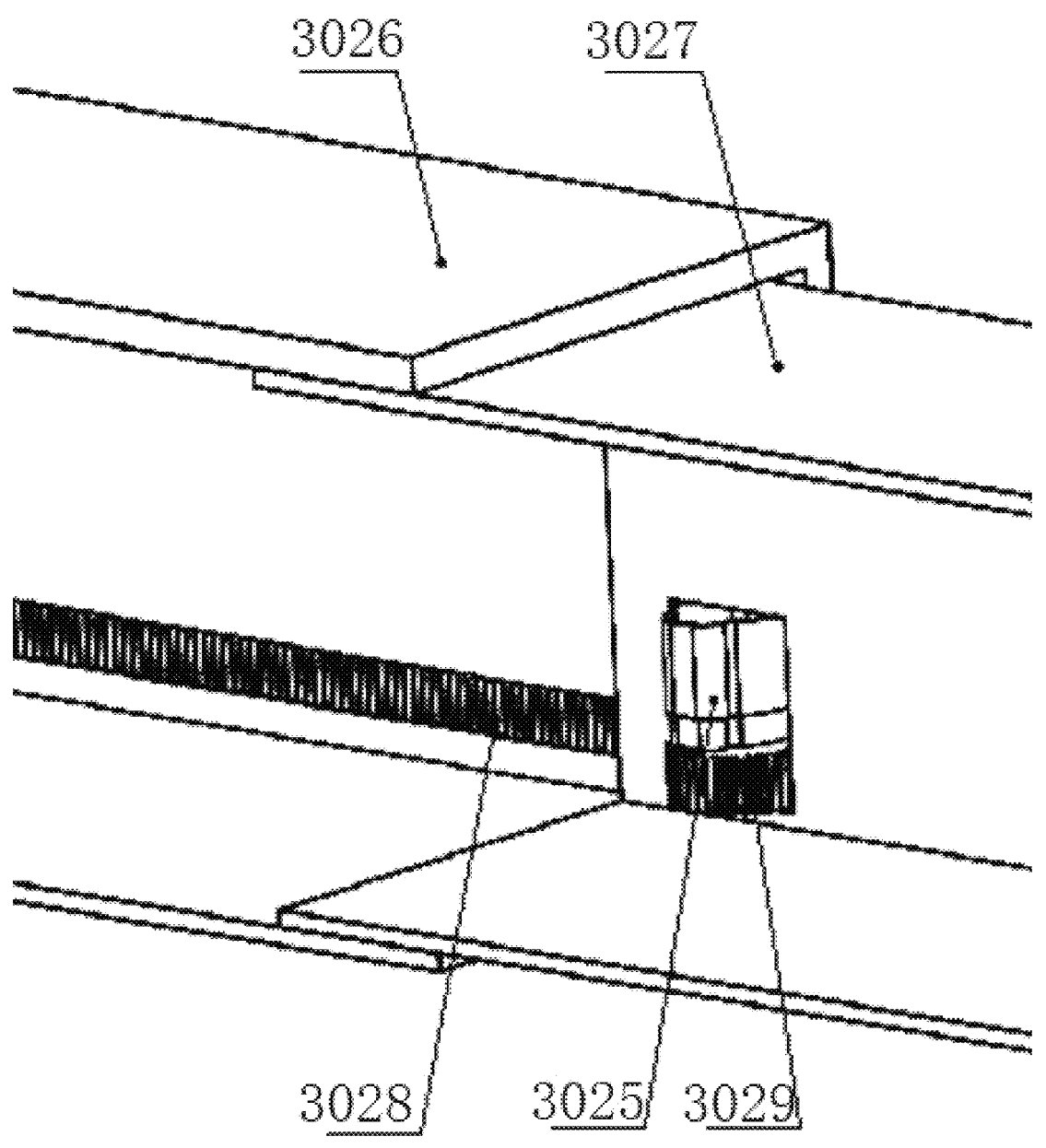
FIG. 13 is an enlarged local sectional schematic diagram of an automatic index finger telescopic arm or an automatic thumb telescopic arm in stretching.
Figure 14:
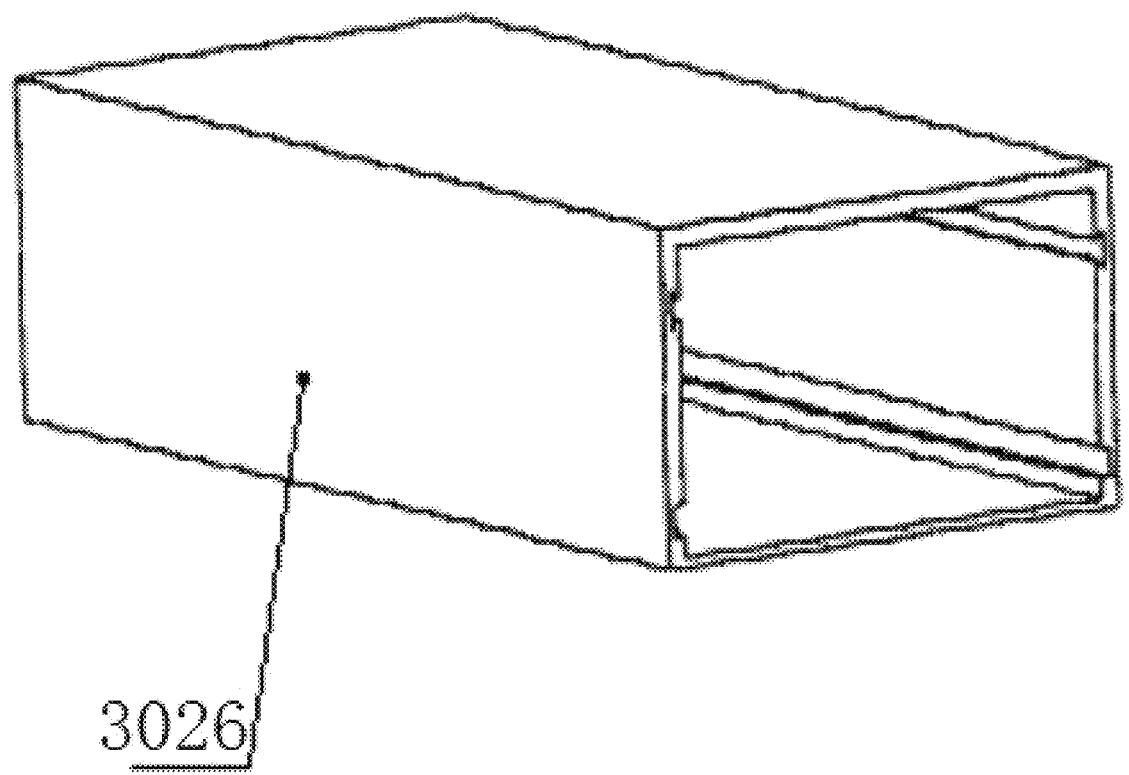
FIG. 14 is a second schematic diagram of a first telescopic arm section.
Figure 15:
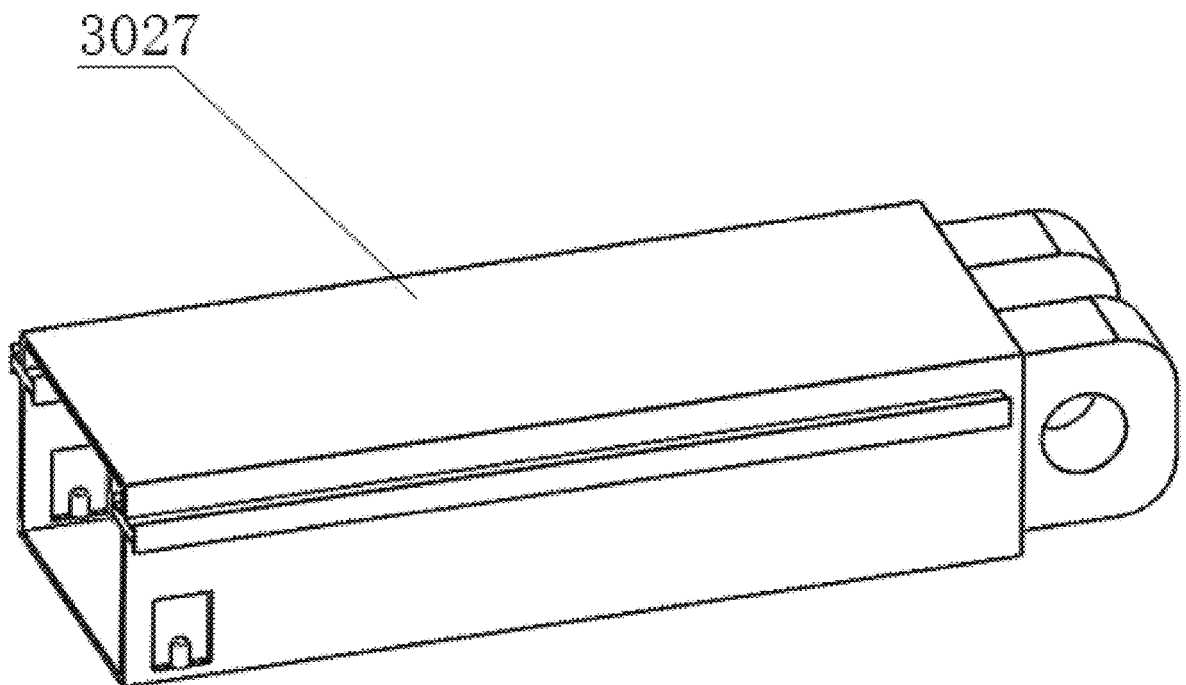
FIG. 15 is a schematic diagram of a second telescopic arm section.
Figure 16:
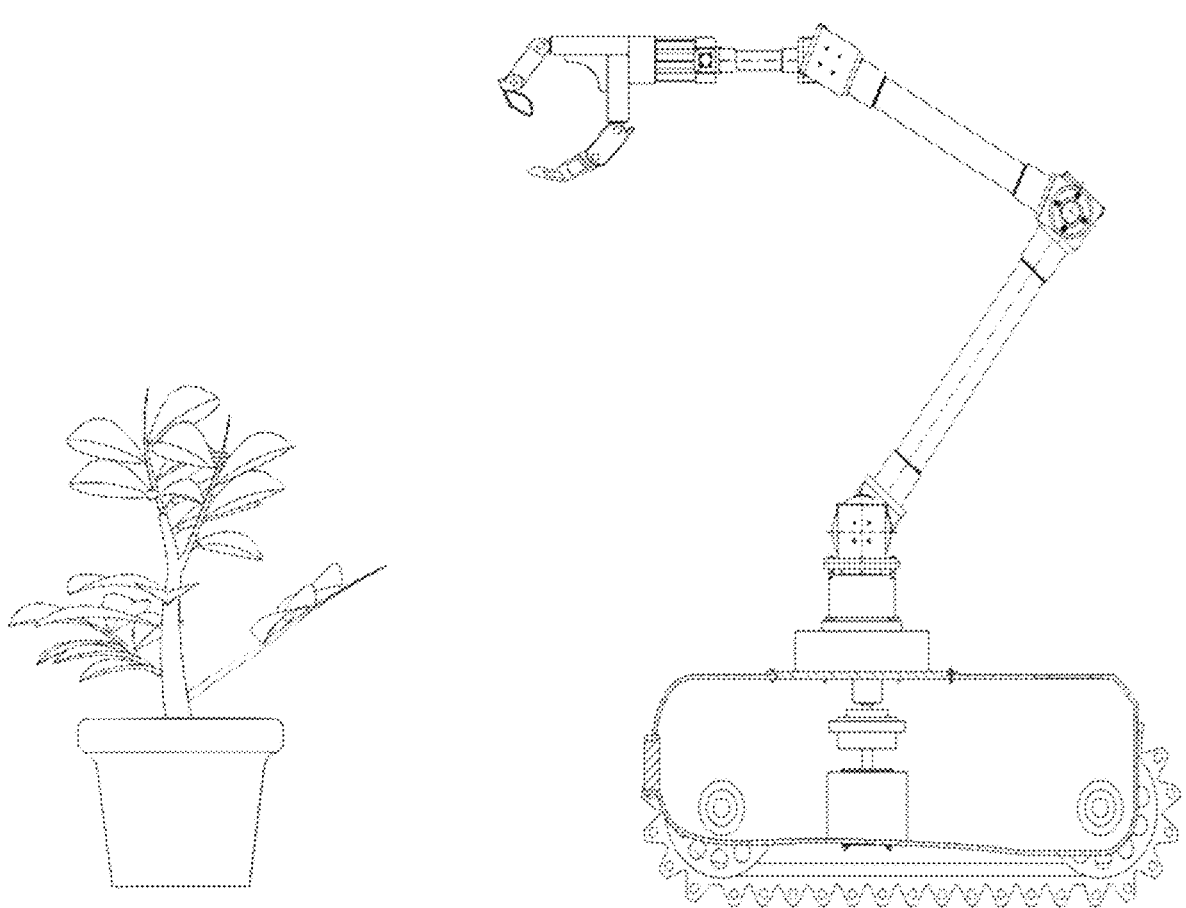
FIG. 16 is a schematic diagram of plant phenotype acquisition according to the present invention.

The soft mechanical hand module 300 includes a rotating motor 301 and a soft mechanical hand assembly; and the end arm rod 203 of the robotic arm is connected to the rotating motor 301 by means of the second connecting seat 205. As shown in FIG. 8 to FIG. 9, the soft mechanical hand assembly includes an index finger assembly 302, a thumb assembly 303, a soft cushion 304 and a first connecting seat 305.

After the sensor acquires plant position information, the soft mechanical hand module 300 can rotate flexibly and perform measurement at a proper angle. The soft cushion 304 is connected to the index finger assembly 302 and the thumb assembly 303 and is the flexible part in the present invention, which prevents the plants from being damaged when the soft mechanical hand module 300 performs measurement, and thus nondestructive operation in the phenotype information acquisition process is realized.

As shown in FIG. 8 to FIG. 9, the index finger assembly 302 includes an automatic index finger telescopic arm, an index finger connecting joint 3021 and an index finger end joint 3022; an end of the automatic index finger telescopic arm is rotationally connected to the index finger connecting joint 3021, and a first driving mechanism 3023 for driving the index finger connecting joint 3021 to rotate is arranged on the automatic index finger telescopic arm; and the index finger connecting joint 3021 is rotationally connected to the index finger end joint 3022, and a second driving mechanism 3024 for driving the index finger end joint 3022 to rotate is arranged on the index finger connecting joint 3021. The first driving mechanism 3023 is connected to the automatic index finger telescopic arm, and an output end of the first driving mechanism 3023 is connected onto the index finger connecting joint 3021. The first driving mechanism 3023 is configured to drive the index finger connecting joint 3021 to rotate. The second driving mechanism 3024 is connected onto the index finger connecting joint 3021, and an output end of the second driving mechanism 3024 is connected to the index finger end joint 3022. The second driving mechanism 3024 is configured to drive the index finger end joint 3022 to rotate.

As shown in FIG. 8 to FIG. 9, the thumb assembly 303 includes an automatic thumb telescopic arm, a thumb connecting joint 3031 and a thumb end joint 3032; an end of the automatic thumb telescopic arm is rotationally connected to the thumb connecting joint 3031, and a third driving mechanism 3033 for driving the thumb connecting joint 3031 to rotate is arranged on the automatic thumb telescopic arm; and the thumb connecting joint 3031 is rotationally connected to the thumb end joint 3032, and a fourth driving mechanism 3034 for driving the thumb end joint 3032 to rotate is arranged on the thumb connecting joint 3031. The third driving mechanism 3033 is connected onto the automatic thumb telescopic arm, and an output end of the third driving mechanism 3033 is connected to the thumb connecting joint 3031. The third driving mechanism 3033 is configured to drive the thumb connecting joint 3031 to rotate. The fourth driving mechanism 3034 is connected onto the thumb connecting joint 3031, and an output end of the fourth driving mechanism 3034 is connected to the thumb end joint 3032. The fourth driving mechanism 3034 is configured to drive the thumb end joint 3032 to rotate.

An output end of the rotating motor 301 is connected to the first connecting seat 305; the first connecting seat 305 is connected to the automatic index finger telescopic arm and the automatic thumb telescopic arm simultaneously; and the soft cushion 304 is connected between the automatic index finger telescopic arm and the automatic thumb telescopic arm.

The index finger connecting joint 3021, the thumb connecting joint 3031, the index finger end joint 3022 and the thumb end joint 3032 are all made of flexible materials and are the flexible parts in the present invention.

The automatic thumb telescopic arm and the automatic index finger telescopic arm are the same in structure, as shown in FIG. 10 to FIG. 15, each of the automatic thumb telescopic arm and the automatic index finger telescopic arm includes a sixth driving mechanism 3025, a first telescopic arm section 3026, a second telescopic arm section 3027, a telescopic arm rack 3028 and a transmission gear 3029; the sixth driving mechanism 3025 is connected to the second telescopic arm section 3027; an output shaft of the sixth driving mechanism 3025 is connected to the transmission gear 3029; the transmission gear 3029 is meshed with the telescopic arm rack 3028; the telescopic arm rack 3028 is connected to the first telescopic arm section 3026; one end of the second telescopic arm section 3027 is located on an inner side of the first telescopic arm section 3026, and the second telescopic arm section 3027 and the first telescopic arm section 3026 are connected in a sliding mode by means of a sliding rail 3030. The sixth driving mechanism 3025 is started to drive the transmission gear 3029 to rotate, and the transmission gear 3029 is meshed with the telescopic arm rack 3028 to drive a telescopic motion between the first telescopic arm section 3026 and the second telescopic arm section 3027 of a thumb. The sliding rail 3030 ensures the telescopic stability.

The first telescopic arm section 3026 and the second telescopic arm section 3027 are made of rigid materials and are the rigid parts in the present invention.

The first driving mechanism 3023, the second driving mechanism 3024, the third driving mechanism 3033, the fourth driving mechanism 3034 and the sixth driving mechanism 3025 are stepping motors; and the fifth driving mechanism 1021 is a servo motor.

A first sensor and a second sensor are arranged on surfaces of the index finger end joint 3022, the thumb end joint 3032 and the soft cushion 304; the first sensor and the second sensor are both electrically connected to the controller; and the controller is electrically connected to the fifth driving mechanism 1021 in the robotic arm rotating base 102, the sixth driving mechanism 3025 in the automatic index finger telescopic arm, and the sixth driving mechanism 3025, the first driving mechanism 3023, the second driving mechanism 3024, the third driving mechanism 3033 and the fourth driving mechanism 3034 in the automatic thumb telescopic arm simultaneously.

The first sensor is configured to detect whether it makes contact with a surface of a plant or not and transmit a signal to the controller, the second sensor is configured to detect the distance and transmit a signal to the controller, and the controller is configured to control the fifth driving mechanism 1021 in the robotic arm rotating base 102, the sixth driving mechanism 3025 in the automatic index finger telescopic arm, and the sixth driving mechanism 3025, the first driving mechanism 3023, the second driving mechanism 3024, the third driving mechanism 3033 and the fourth driving mechanism 3034 in the automatic thumb telescopic arm to work.

The first sensors are fiber bragg grating sensors and are arranged at a fingertip of the index finger end joint 3022, a fingertip of the thumb end joint 3032 and the soft cushion 304.

The second sensors include a self-inductive sensor and metal objects (metal sheets); the self-inductive sensor is arranged at the fingertip of the index finger end joint 3022; and the metal objects are arranged on the fingertip of the thumb end joint 3032 and the soft cushion 304.

The soft mechanical hand module 300 integrates a plurality of sensors to realize nondestructive tactile measurement of the plant phenotype. The fiber bragg grating sensors have good flexibility, have high sensitivity to pressure and shear force, and can accurately sense the sliding direction and position of an object to make ensure that mechanical fingers make contact with the surface of the plant, thus providing more comprehensive tactile feedback. The fiber bragg grating sensors are arranged at the fingertip of the index finger end joint 3022, the fingertip of the thumb end joint 3032 and in the soft cushion 304 to realize multi-point distributed tactile feedback. The self-inductive sensor is configured to generate inductance change to compute the distance after detecting a metal object. The self-inductive sensor is mounted at the fingertip of the index finger end joint 3022, and the metal sheets are installed at the fingertip of the thumb end joint 3032 and in the soft cushion 304 to measure the distance. The tactile perception of the mechanical hand can be realized through the fiber bragg grating sensors, the mechanical hand stops moving after making contact with the plant to be measured, and then the self-inductive sensor can calibrate and directly obtain the distance. Through cooperation, the soft mechanical hand module 300 can be configured to measure the plant phenotype parameters.

Figure 17:
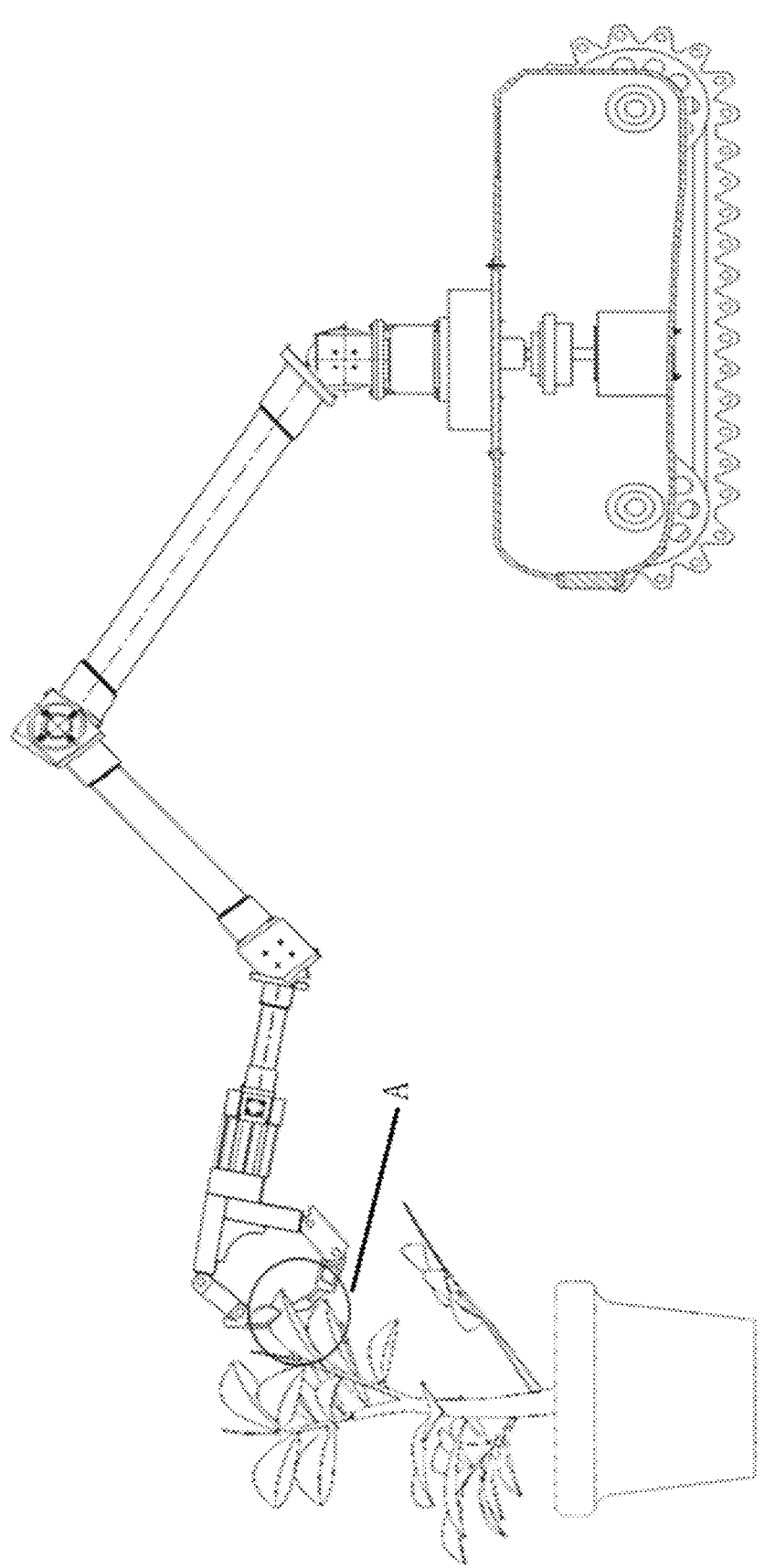
FIG. 17 is a schematic diagram of leaf thickness measurement by a soft mechanical hand module.
Figure 18:
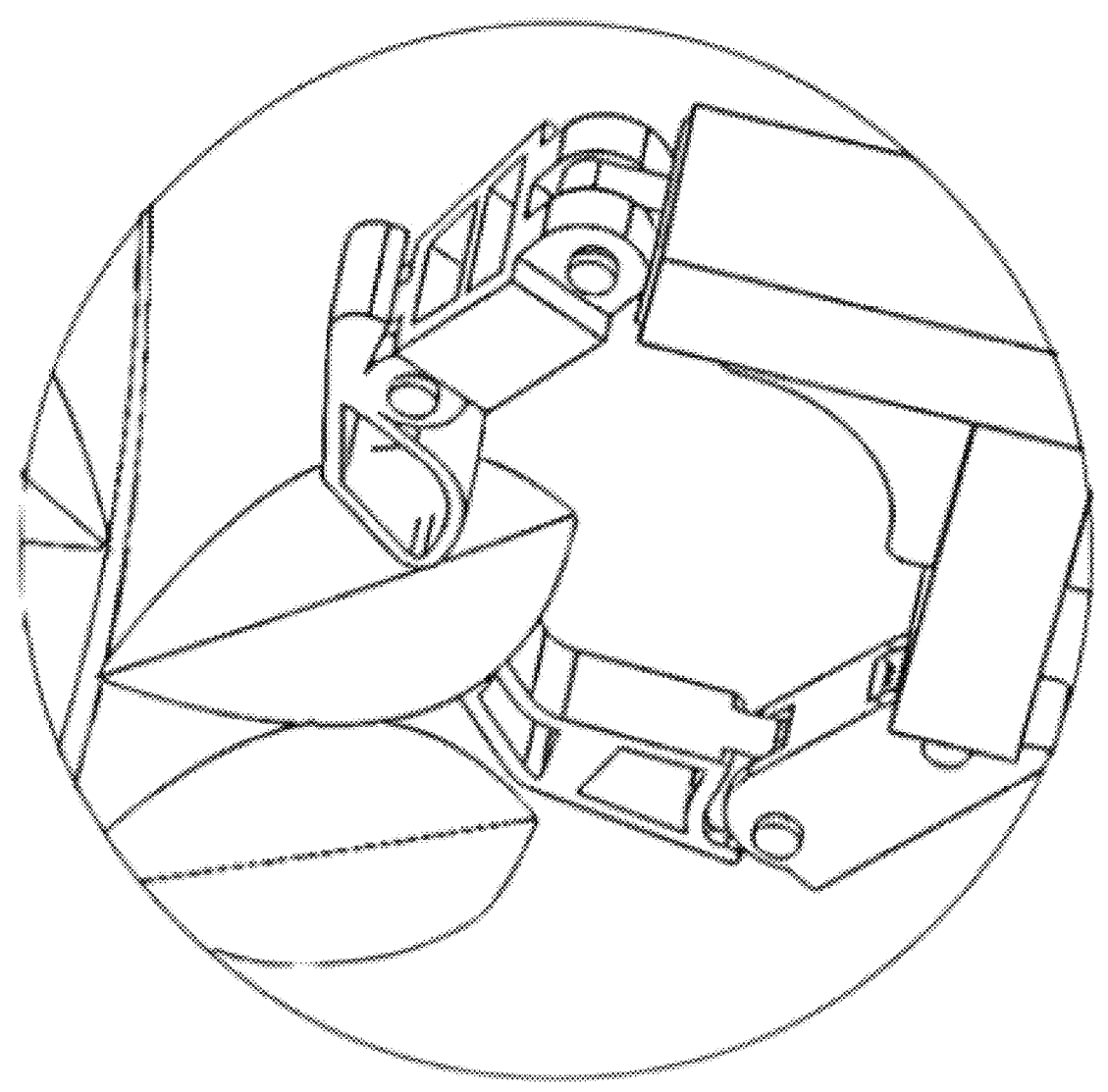
FIG. 18 is a partial enlarged view of an internal structure of A in FIG. 17.

An embodiment further provides a rigid-flexible coupling robotic arm type measurement method for plant phenotype information, and the method includes that:

an image acquisition module acquires image information of a trunk to be measured and transmits the image information to a controller, the controller determines the position of a target to be measured according to the image information, and controls a fifth driving mechanism 1021 in a robotic arm rotating base 102 to act so as to make a soft mechanical hand module 300 to face the target to be measured, and the controller controls seventh driving mechanisms 2041 in a plurality of robotic arm flexible joints 204 in a flexible robotic arm module 200 to act so as to make a soft mechanical hand module 300 to move towards the position of the target to be measured;

with reference to FIG. 17 and FIG. 18, if the target to be measured is a leaf, the controller controls a first driving mechanism 3023, a second driving mechanism 3024, a third driving mechanism 3033 and a fourth driving mechanism 3034 in the soft mechanical hand module 300 to act respectively, and then controls an index finger connecting joint 3021, an index finger end joint 3022, a thumb connecting joint 3031 and a thumb end joint 3032 to rotate respectively until a surface of the leaf to be measured is clamped by a fingertip of the index finger end joint 3022 and a fingertip of the thumb end joint 3032; when a fiber bragg grating sensor at the fingertip of the index finger end joint 3022 and a fiber bragg grating sensor at the fingertip of the thumb end joint 3032 touch the surface of the leaf to be measured, the fiber bragg grating sensors will transmit signals to the controller, then the controller controls the first driving mechanism 3023, the second driving mechanism 3024, the third driving mechanism 3033 and the fourth driving mechanism 3034 to stop acting, at the moment, a self-inductive sensor at the fingertip of the index finger end joint 3022 will detect a metal object at the fingertip of the thumb end joint 3032 and transmits a signal to the controller, thus measuring and obtaining the thickness of the surface of the blade to be measured. Before measurement, a standard object with the known size will be used for calibrating a system, and a relationship will be established between inductance change and distance.

Figure 19:
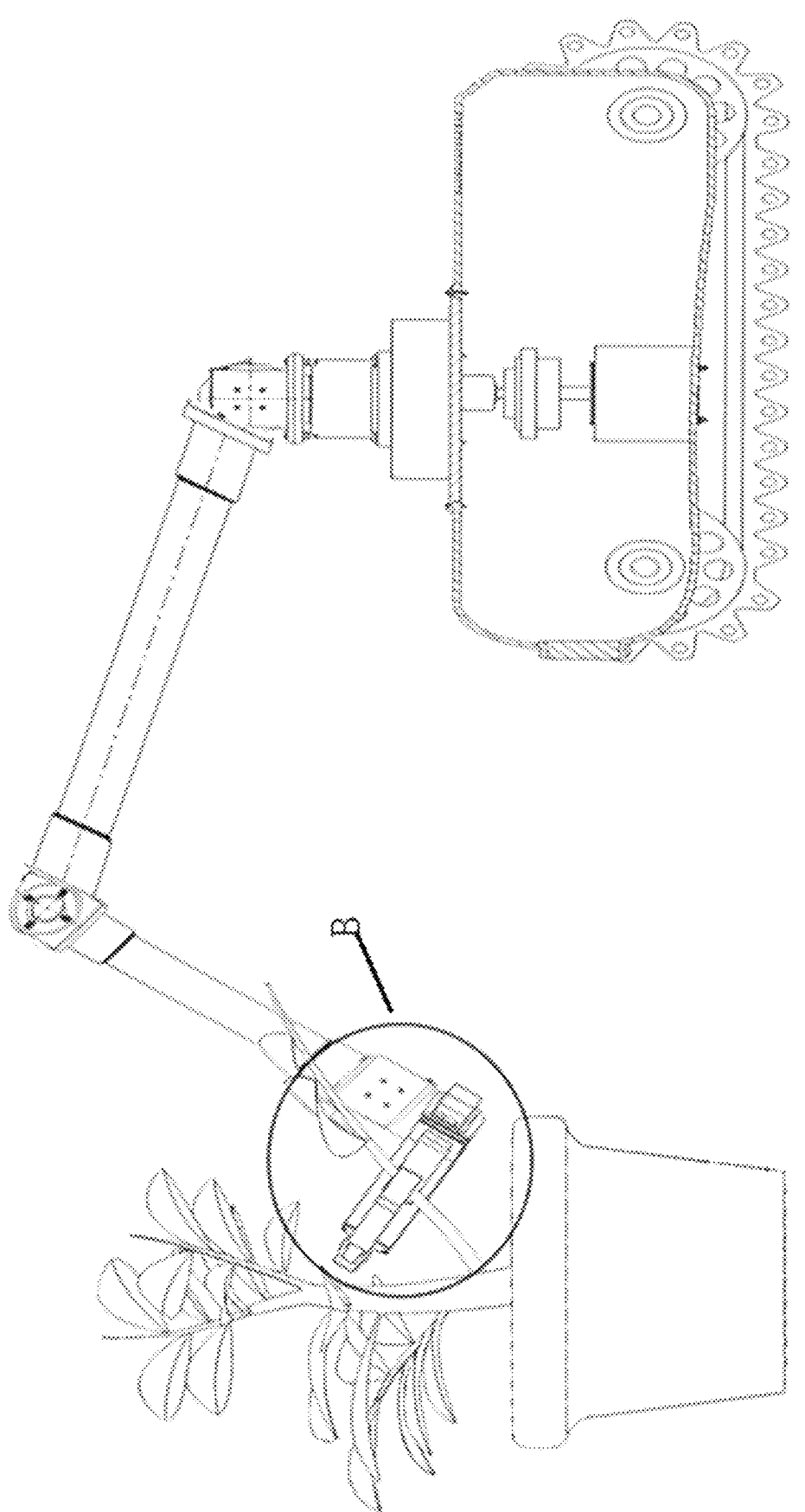
FIG. 19 is a schematic diagram of a soft mechanical hand module working in measurement of thin and long targets such as branches of trees and side branches of crops.
Figure 20:
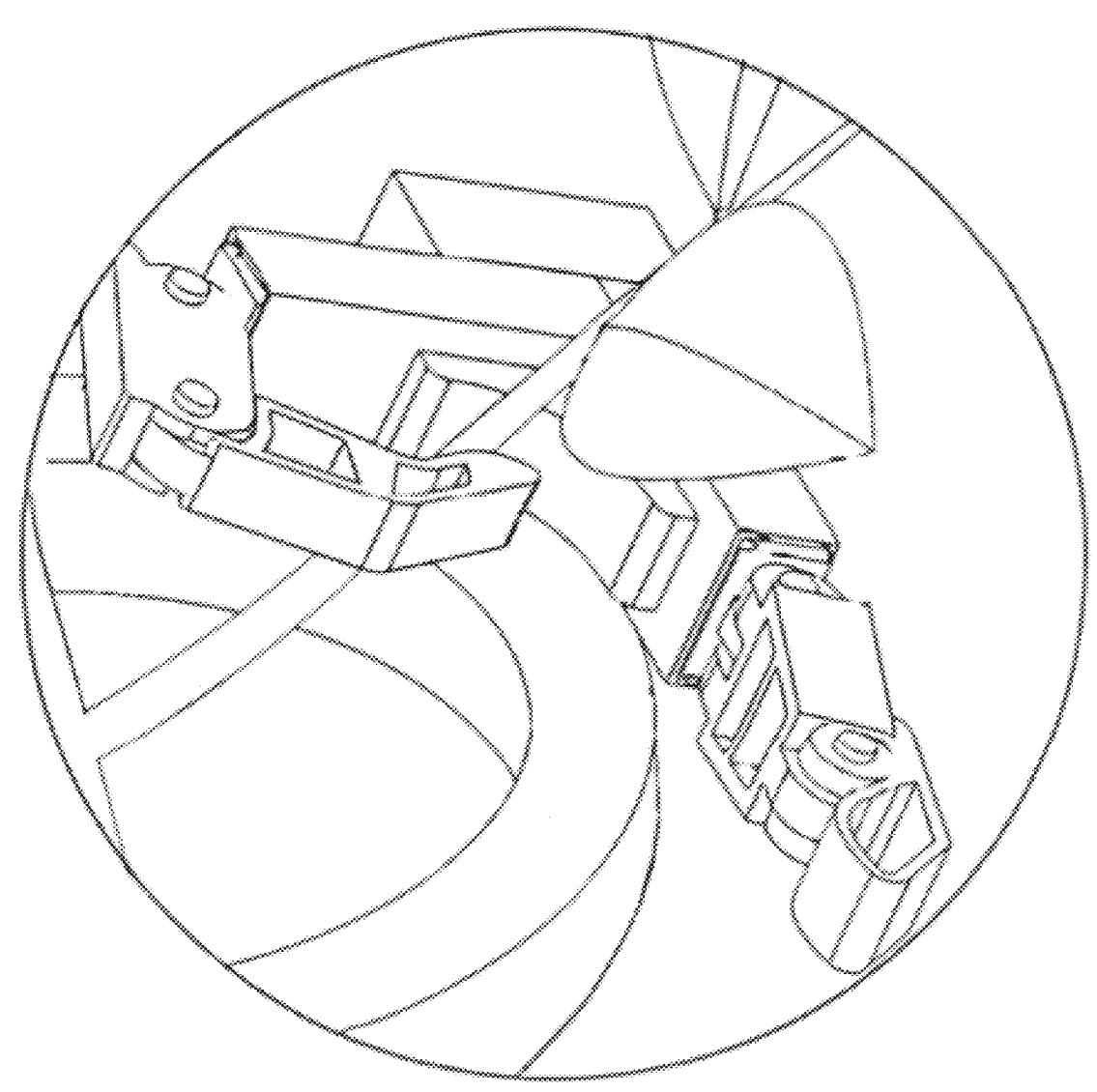
FIG. 20 is a local enlarged view of an internal structure of B in FIG. 19.
Figure 21:
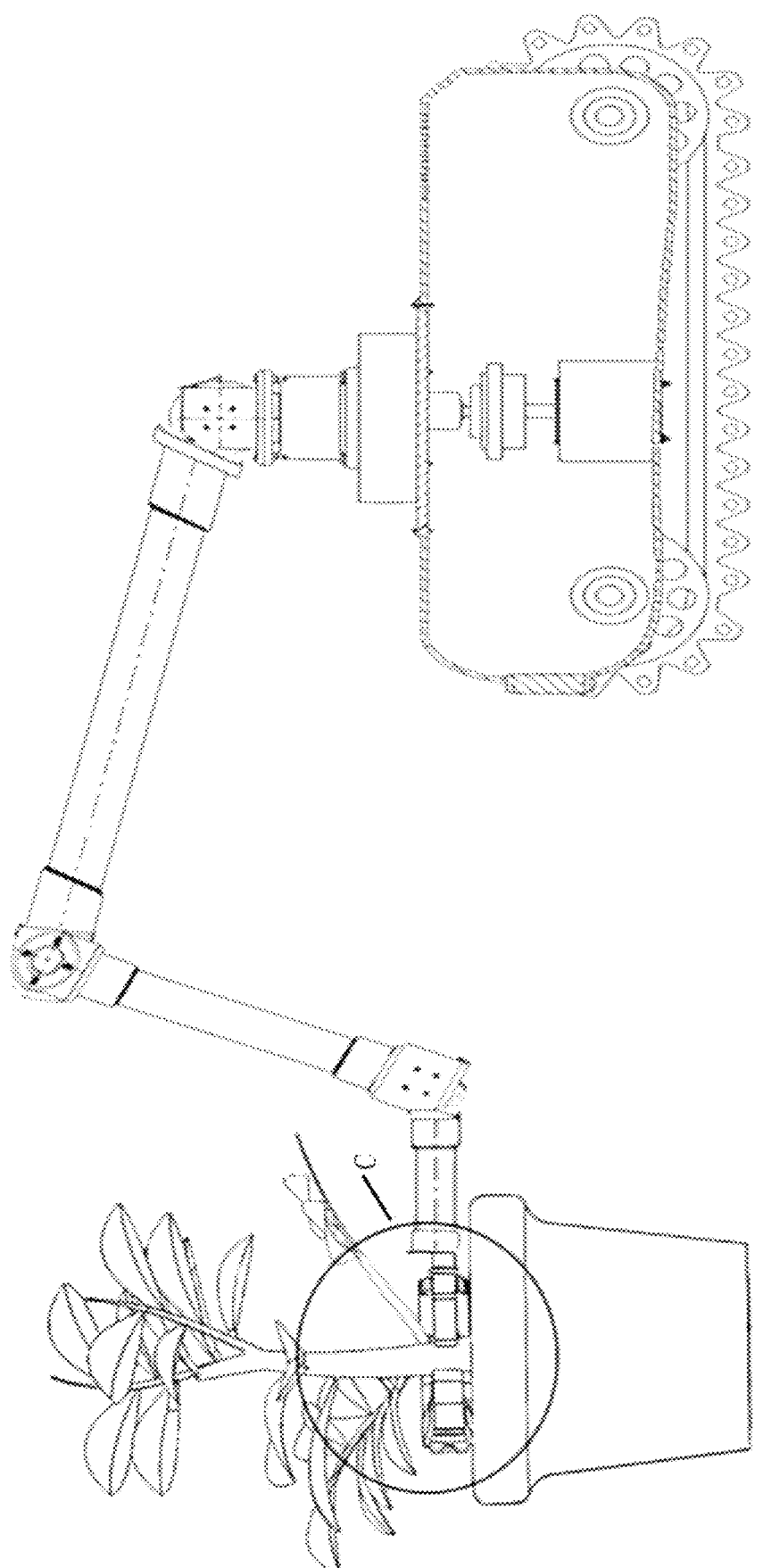
FIG. 21 is a schematic diagram of a soft mechanical hand module working in measurement of thick and large targets such as trunks of trees and stems of crops.
Figure 22:
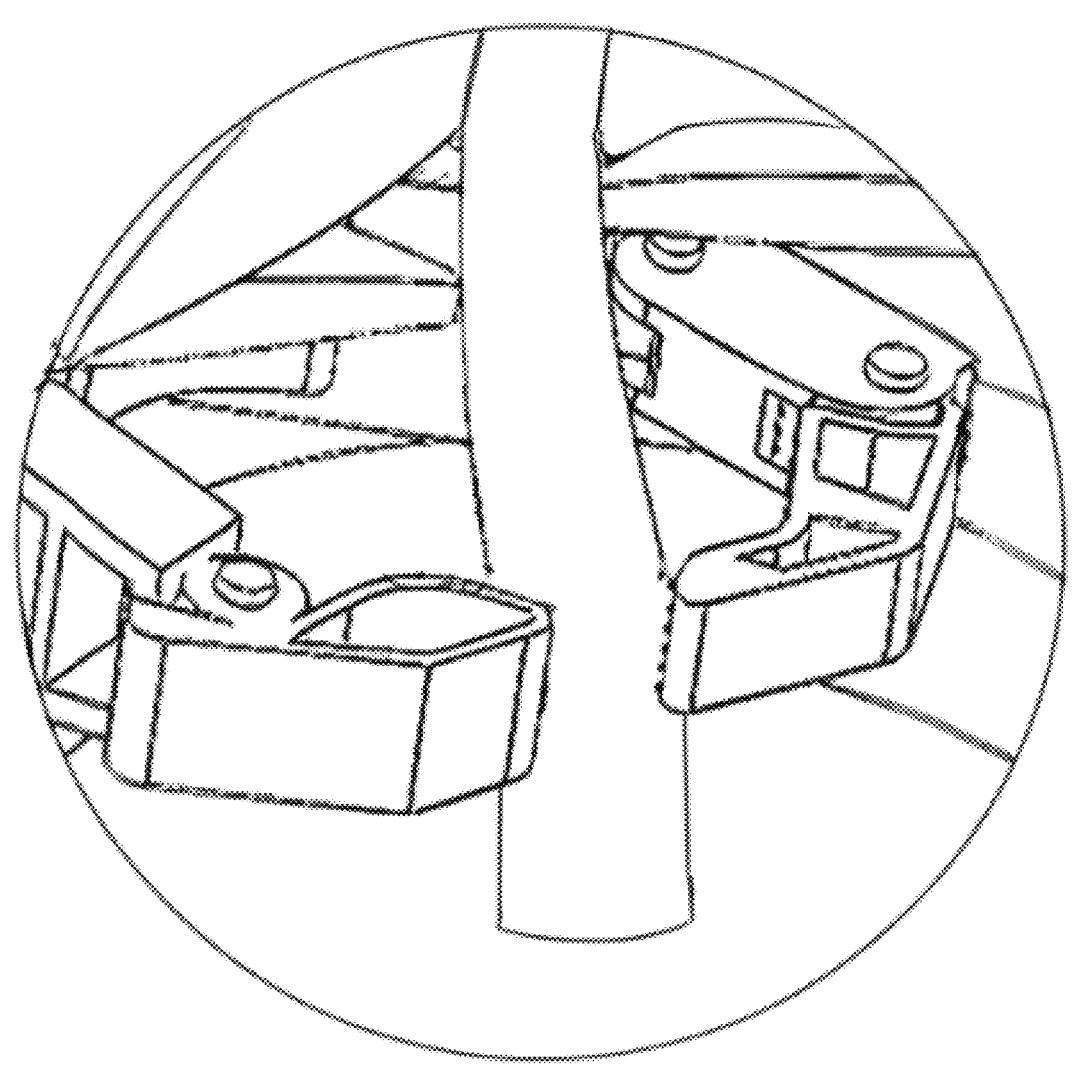
FIG. 22 is a local enlarged view of an internal structure of C in FIG. 21.
Figure 23:
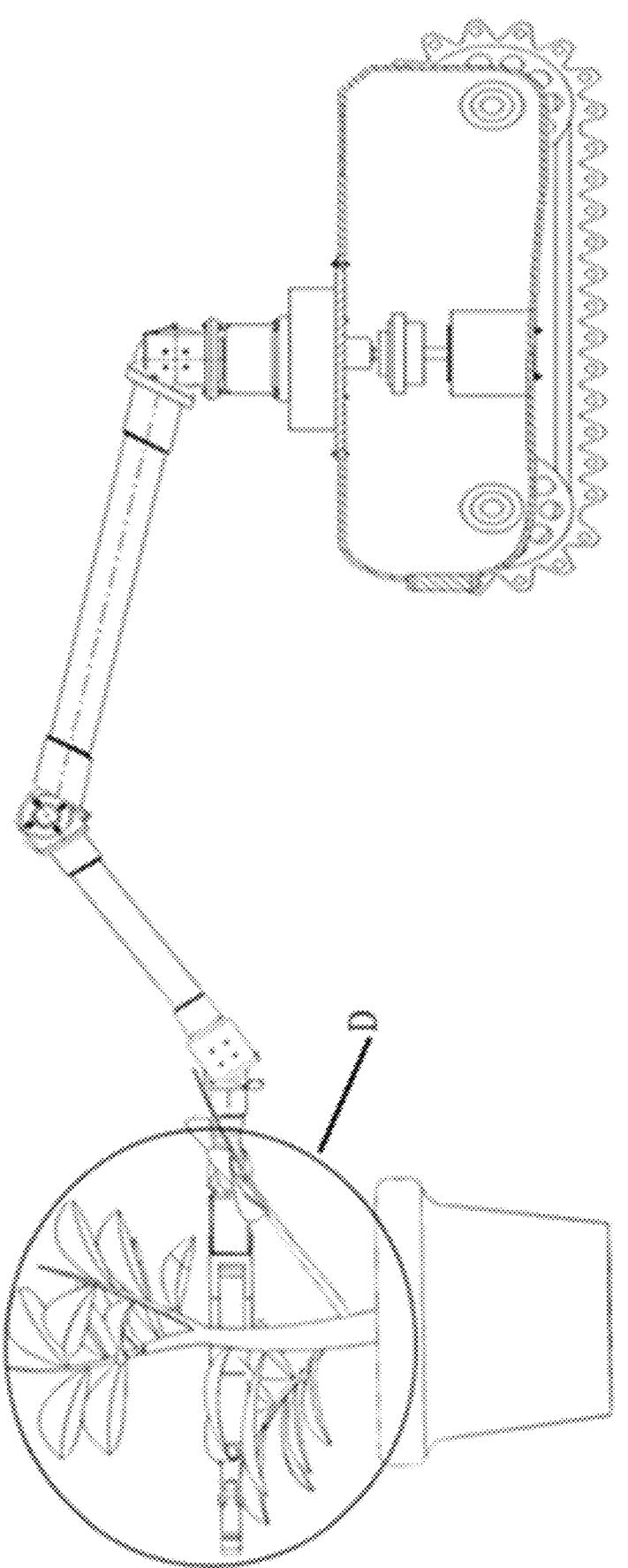
FIG. 23 is a schematic diagram of a soft mechanical hand module working in measurement of crown breadth.
Figure 24:
FIG. 24 is a local enlarged view of an internal structure of D in FIG. 23.

With reference to FIG. 19 and FIG. 20, if the target to be measured is a long and thin target such as branches of trees or side branches of crops, the controller controls the first driving mechanism 3023 and the second driving mechanism 3024 in the soft mechanical hand module 300 to act respectively, and then controls the index finger connecting joint 3021 and the index finger end joint 3022 to rotate respectively until the index finger connecting joint 3021 and the index finger end joint 3022 surround the long and thin target to be measured; when a fiber bragg grating sensor on the soft cushion 304 and the fiber bragg grating sensor at the fingertip of the index finger end joint 3022 touch the long and thin target to be measured, the fiber bragg grating sensors will transmit signals to the controller, then the controller controls the first driving mechanism 3023 and the second driving mechanism 3024 to stop acting, and at the moment, the self-inductive sensor at the fingertip of the index finger end joint 3022 will detect the metal object on the soft cushion 304 and transmit a signal to the controller, thus measuring and obtaining the diameter of the long and thin target to be measured;

With reference to FIG. 21 and FIG. 22, if the target to be measured is a thick and large target such as trunks of trees and stems of crops, the controller controls the first driving mechanism 3023, the second driving mechanism 3024, the third driving mechanism 3033 and the fourth driving mechanism 3034 in the soft mechanical hand module 300 to act respectively, and then controls the index finger connecting joint 3021, the index finger end joint 3022, the thumb connecting joint 3031 and the thumb end joint 3032 to rotate respectively until the thick and large target to be measured is clamped by the fingertip of the index finger end joint 3022 and the fingertip of the thumb end joint 3032; when the fiber bragg grating sensor at the fingertip of the index finger end joint 3022 and the fiber bragg grating sensor at the fingertip of the thumb end joint 3032 touch the thick and large target to be measured, the fiber bragg grating sensors will transmit signals to the controller, then the controller controls the first driving mechanism 3023, the second driving mechanism 3024, the third driving mechanism 3033 and the fourth driving mechanism 3034 to stop acting, at the moment, the self-inductive sensor at the fingertip of the index finger end joint 3022 will detect the metal object at the fingertip of the thumb end joint 3032 and transmit a signal to the controller, thus measuring and obtaining the diameter of the thick and large target to be measured;

With reference to FIG. 23 and FIG. 24, if the target to be measured is crown breadth, the controller controls sixth driving mechanisms 3025 in the automatic thumb telescopic arm and the automatic index finger telescopic arm in the soft mechanical hand module 300 to act respectively, and the automatic thumb telescopic arm and the automatic index finger telescopic arm will stretch. The automatic thumb telescopic arm and the automatic index finger telescopic arm stretch to the maximum or preset positions, so that the measuring range of the soft mechanical hand is expanded. The controller controls the first driving mechanism 3023, the second driving mechanism 3024, the third driving mechanism 3033 and the fourth driving mechanism 3034 to act respectively, and then controls the index finger connecting joint 3021, the index finger end joint 3022, the thumb connecting joint 3031 and the thumb end joint 3032 to rotate respectively until the index finger connecting joint 3021, the index finger end joint 3022, the thumb connecting joint 3031 and the thumb end joint 3032 envelop the target to be measured; when the fiber bragg grating sensor at the fingertip of the index finger end joint 3022 and the fiber bragg grating sensor at the fingertip of the thumb end joint 3032 touch the target to be measured, the fiber bragg grating sensors will transmit signals to the controller, and then the controller controls the first driving mechanism 3023, the second driving mechanism 3024, the third driving mechanism 3033 and the fourth driving mechanism 3034 to stop acting, namely, further enveloping is stopped; and then measurement is started, at the moment, the self-inductive sensor at the fingertip of the index finger end joint 3022 will measure the metal object at the fingertip of the thumb end joint 3032 and transmit a signal to the controller, thus measuring and obtaining the crown breadth of the target to be measured. In the embodiment, the crown breadth can also be obtained by measuring the distances in a plurality of directions and averaging the distances.

The image acquisition module, the controller and the like can be mounted on the measurement platform in the embodiment. Signal processing software and control software in the controller are software in the related technology. The controller of the measurement platform in the embodiment can also be wirelessly connected to a remote control device, the remote control device can control a driving motor in the crawler walking device 101 (adopting an existing structure) to act through the controller, and the remote control device controls the crawler walking device 101 to walk to a position near the target to be measured. The remote control device can also control the first driving mechanism 3023, the second driving mechanism 3024, the third driving mechanism 3033, the fourth driving mechanism 3034, the fifth driving mechanism 1021, the sixth driving mechanism 3025 and the seventh driving mechanism 2041 to work by means of the controller. The measurement platform in the embodiment can also be provided with a GPS module for determining the direction, thus facilitating the measurement of the crown breadth. Some driving mechanisms, sensors and the like on the platform, the controller and the like are all connected to a power supply, and the power supply can be arranged on the measurement platform.

For different measuring targets and parameters to be measured, the soft mechanical hand module 300 has four working conditions for collecting the plant phenotype information. Condition 1: when measuring the thickness of the leaf, a camera (an image collecting module) is configured to position the leaf target to be measured according to a collected image, and then the thumb end joint 3032 and the index finger end joint 3022 are configured to clamp and touch a front surface (also called as an upper surface and a sunny slope) and a back surface (also called as a lower surface and an earthward surface) of the leaf for measurement. Condition 2: when measuring the long and thin targets such as the branches of the trees and the side branches of the crops, after positioning, the index finger assembly 302 can move to surround the target to be measured for measurement. Condition 3: when measuring the thick and big targets such as the trunks of the trees and the stems of the trees, the thumb assembly 303 and the index finger assembly 302 can be configured to envelop the target to be measured for measurement. Condition 4: when measuring the crown breadth, the telescopic arm is controlled to stretch to expand the measuring range, and the thumb assembly 303 and the index finger assembly 302 are cooperated for measurement. In the Conditions 1, 2 and 3, the phenotype information of the plant organs can measured; and in the Condition 4, the phenotype information of the whole plant can be measured. The soft mechanical hand module 300 can adapt to acquisition of plant phenotype information under various conditions.

What is claimed is:

1. A rigid-flexible coupling robotic arm type measurement platform for plant phenotype information includes a controller, a crawler walking module (100), a flexible robotic arm module (200) and a soft mechanical hand module (300);

the crawler walking module (100) includes a crawler walking device (101), and a robotic arm rotating base (102) which is configured to drive the flexible robotic arm module (200) to rotate; the crawler walking device (101) is connected to the flexible robotic arm module (200) by means of the robotic arm rotating base (102); and the flexible robotic arm module (200) is connected to the soft mechanical hand module (300);

the soft mechanical hand module (300) includes a rotating motor (301) and a soft mechanical hand assembly; the soft mechanical hand assembly includes an index finger assembly (302), a thumb assembly (303), a soft cushion (304) and a first connecting seat (305);

the index finger assembly (302) includes an automatic index finger telescopic arm, an index finger connecting joint (3021) and an index finger end joint (3022); an end of the automatic index finger telescopic arm is rotationally connected to the index finger connecting joint (3021), and a first driving mechanism (3023) for driving the index finger connecting joint (3021) to rotate is arranged on the automatic index finger telescopic arm; and the index finger connecting joint (3021) is rotationally connected to the index finger end joint (3022), and a second driving mechanism (3024) for driving the index finger end joint (3022) to rotate is arranged on the index finger connecting joint (3021);

the thumb assembly (303) includes an automatic thumb telescopic arm, a thumb connecting joint (3031) and a thumb end joint (3032); an end of the automatic thumb telescopic arm is rotationally connected to the thumb connecting joint (3031), and a third driving mechanism (3033) for driving the thumb connecting joint (3031) to rotate is arranged on the automatic thumb telescopic arm; and the thumb connecting joint (3031) is rotationally connected to the thumb end joint (3032), and a fourth driving mechanism (3034) for driving the thumb end joint (3032) to rotate is arranged on the thumb connecting joint (3031);

an output end of the rotating motor (301) is connected to the first connecting seat (305); the first connecting seat (305) is connected to the automatic index finger telescopic arm and the automatic thumb telescopic arm simultaneously; and the soft cushion (304) is connected between the automatic index finger telescopic arm and the automatic thumb telescopic arm;

the index finger end joint (3022) and the thumb end joint (3032) are all made of flexible materials;

a first sensor and a second sensor are arranged on surfaces of the index finger end joint (3022), the thumb end joint (3032) and the soft cushion (304); the first sensor and the second sensor are both electrically connected to the controller; and the controller is electrically connected to the fifth driving mechanism (1021) in the robotic arm rotating base (102), the sixth driving mechanism (3025) in the automatic index finger telescopic arm, and the sixth driving mechanism (3025), the first driving mechanism (3023), the second driving mechanism (3024), the third driving mechanism (3033) and the fourth driving mechanism (3034) in the automatic thumb telescopic arm simultaneously;

the first sensor is configured to detect whether it makes contact with a surface of a plant or not and transmit a signal to the controller, the second sensor is configured to detect the distance and transmit a signal to the controller, and the controller is configured to control the fifth driving mechanism (1021) in the robotic arm rotating base (102), the sixth driving mechanism (3025) in the automatic index finger telescopic arm, and the sixth driving mechanism (3025), the first driving mechanism (3023), the second driving mechanism (3024), the third driving mechanism (3033) and the fourth driving mechanism (3034) in the automatic thumb telescopic arm to work.

2. The rigid-flexible coupling robotic arm type measurement platform, as recited in claim 1, wherein: the robotic arm rotating base (102) includes a fifth driving mechanism (1021), a first harmonic reducer (1022), a connecting shaft (1023), a first elastic coupling (1024), a robotic arm bottom transmission shaft (1025), a first spline (1026), a spur gear shaft (1027), a second bearing (1028), a first bearing (1029), an inner gear ring (1030), a robotic arm fixing base (1031), a rotating seat (1032) and a base cover plate (1033);

an output shaft of the fifth driving mechanism (1021) is connected to the first harmonic reducer (1022); the first harmonic reducer (1022) is connected to the connecting shaft (1023); the connecting shaft (1023) is connected to the robotic arm bottom transmission shaft (1025) by means of the first elastic coupling (1024); the robotic arm bottom transmission shaft (1025) is connected to the spur gear shaft (1027) by means of the first spline (1026); the spur gear shaft (1027) passes through a through hole in a bottom part of the robotic arm fixing base (1031) and then is rotationally connected to the robotic arm fixing base (1031) by means of the second bearing (1028); the spur gear shaft (1027) is meshed with the inner gear ring (1030); the inner gear ring (1030) is fixedly connected to the rotating seat (1032); the rotating seat (1032) is rotationally connected to the robotic arm fixing base (1031) by means of the first bearing (1029), and a top part of the rotating seat (1032) is positioned on an outer side of a through hole in a top part of the robotic arm fixing base (1031); the bottom part of the robotic arm fixing base (1031) is connected to the base cover plate (1033) by means of bolts; and the base cover plate (1033) and the fifth driving mechanism (1021) are both connected to the crawler walking device (101) by means of bolts.

3. The rigid-flexible coupling robotic arm type measurement platform, as recited in claim 2, wherein: the flexible robotic arm module (200) includes a first arm rod (201) of the robotic arm, a second arm rod (202) of the robotic arm, an end arm rod (203) of the robotic arm and flexible joints (204) of the robotic arm, the robotic arm rotating base (102) is connected to the first arm rod (201) of the robotic arm by means of a flexible joint (204) of the robotic arm, the first arm rod (201) of the robotic arm is connected to the second arm rod (202) of the robotic arm by means of a flexible joint (204) of the robotic arm, the second arm rod (202) of the robotic arm is connected to the end arm rod (203) of the robotic arm by means of a flexible joint (204) of the robotic arm, and the end arm rod (203) of the robotic arm is connected to a rotating motor (301) by means of a second connecting seat (205);

the flexible joint (204) of the robotic arm includes a seventh driving mechanism (2041), a motor box (2042), a second harmonic reducer (2043), a flexible joint output shaft (2044), a third bearing (2045), a second elastic coupler (2046), a first spring connecting seat (2047), a spring (2048), a second spring connecting seat (2056), a second spline (2049), a connecting member (2050) and a joint housing (2051);

the seventh driving mechanism (2041) is connected into the motor box (2042) by means of bolts; an output shaft of the seventh driving mechanism (2041) is connected to the flexible joint output shaft (2044) by means of the second harmonic reducer (2043); the flexible joint output shaft (2044) is rotationally connected to the motor box (2042) through the third bearing (2045); the other end of the flexible joint output shaft (2044) extends outwards from a reserved hole in a rear end of the motor box (2042) and then is connected to the first spring connecting seat (2047) by means of the second elastic coupling (2046); the two ends of the spring (torsional spring) (2048) are connected to the first spring connecting seat (2047) and the second spring connecting seat (2056) respectively; the second spring connecting seat (2056) is connected to the connecting member (2050) by means of the second spline (2049); the connecting member (2050) is connected to the joint housing (2051) by means of bolts; and the second elastic coupling (2046), the first spring connecting seat (2047) and the second spring connecting seat (2056) are all located in an inner hole in the joint housing (2051);

the motor box (2042) is connected to the robotic arm rotating base (102), the first arm rod (201) of the robotic arm or the second arm rod (202) of the robotic arm; and the joint housing (2051) is connected to the first arm rod (201) of the robotic arm, the second arm rod (202) of the robotic arm or the end arm rod (203) of the robotic arm;

the seventh driving mechanism (2041) is electrically connected to the controller.

4. The rigid-flexible coupling robotic arm type measurement platform, as recited in claim 3, wherein: the flexible joint (204) of the robotic arm further includes an oil seal (2052), a bearing end cover (2053) and a joint end cover (2054); the bearing end cover (2053) is connected to a rear end of the motor box (2042) by means of bolts, a rear end of the bearing end cover (2053) is located in the inner hole in the joint housing (2051), and the oil seal (2052) is arranged between the bearing end cover (2053) and an inner wall of the joint housing (2051); and a top part of the motor box (2042) is connected to a motor cover (2055) by means of bolts;

the seventh driving mechanism (2041) is a servo motor.

5. The rigid-flexible coupling robotic arm type measurement platform, as recited in claim 3, wherein: the automatic thumb telescopic arm and the automatic index finger telescopic arm are the same in structure, each of the automatic thumb telescopic arm and the automatic index finger telescopic arm includes a sixth driving mechanism (3025), a first telescopic arm section (3026), a second telescopic arm section (3027), a telescopic arm rack (3028) and a transmission gear (3029); the sixth driving mechanism (3025) is connected to the second telescopic arm section (3027); an output shaft of the sixth driving mechanism (3025) is connected to the transmission gear (3029); the transmission gear (3029) is meshed with the telescopic arm rack (3028); the telescopic arm rack (3028) is connected to the first telescopic arm section (3026); one end of the second telescopic arm section (3027) is located on an inner side of the first telescopic arm section (3026), and the second telescopic arm section (3027) and the first telescopic arm section (3026) are connected in a sliding mode by means of a sliding rail (3030);

the first telescopic arm section (3026) and the second telescopic arm section (3027) are made of rigid materials.

6. The rigid-flexible coupling robotic arm type measurement platform, as recited in claim 1, wherein: the first driving mechanism (3023) is connected to the automatic index finger telescopic arm, and an output end of the first driving mechanism (3023) is connected onto the index finger connecting joint (3021), the second driving mechanism (3024) is connected onto the index finger connecting joint (3021), and an output end of the second driving mechanism (3024) is connected to the index finger end joint (3022);

the third driving mechanism (3033) is connected onto the automatic thumb telescopic arm, and an output end of the third driving mechanism (3033) is connected to the thumb connecting joint (3031); the fourth driving mechanism (3034) is connected onto the thumb connecting joint (3031), and an output end of the fourth driving mechanism (3034) is connected to the thumb end joint (3032);

the index finger connecting joint (3021) and the thumb connecting joint (3031) are all made of flexible materials.

7. The rigid-flexible coupling robotic arm type measurement platform, as recited in claim 6, wherein: the first driving mechanism (3023), the second driving mechanism (3024), the third driving mechanism (3033), the fourth driving mechanism (3034) and the sixth driving mechanism (3025) are stepping motors; and the fifth driving mechanism (1021) is a servo motor.

8. The rigid-flexible coupling robotic arm type measurement platform, as recited in claim 5, wherein: the first sensors are fiber bragg grating sensors and are arranged at a fingertip of the index finger end joint (3022), a fingertip of the thumb end joint (3032) and the soft cushion (304);

the second sensors include a self-inductive sensor and metal objects (metal sheets); the self-inductive sensor is arranged at the fingertip of the index finger end joint (3022); and the metal objects are arranged on the fingertip of the thumb end joint (3032) and the soft cushion (304).

9. A measurement method of the rigid-flexible coupling robotic arm type measurement platform, as recited in claim 8, wherein: the method includes that:

an image acquisition module acquires image information of a trunk to be measured and transmits the image information to a controller, the controller determines the position of a target to be measured according to the image information, and controls a fifth driving mechanism (1021) in a robotic arm rotating base (102) to act so as to make a soft mechanical hand module (300) to face the target to be measured, and the controller controls seventh driving mechanisms (2041) in a plurality of robotic arm flexible joints (204) in a flexible robotic arm module (200) to act so as to make a soft mechanical hand module (300) to move towards the position of the target to be measured;

if the target to be measured is a leaf, the controller controls a first driving mechanism (3023), a second driving mechanism (3024), a third driving mechanism (3033) and a fourth driving mechanism (3034) in the soft mechanical hand module (300) to act respectively, and then controls an index finger connecting joint (3021), an index finger end joint (3022), a thumb connecting joint (3031) and a thumb end joint (3032) to rotate respectively until a surface of the leaf to be measured is clamped by a fingertip of the index finger end joint (3022) and a fingertip of the thumb end joint (3032); when a fiber bragg grating sensor at the fingertip of the index finger end joint (3022) and a fiber bragg grating sensor at the fingertip of the thumb end joint (3032) touch the surface of the leaf to be measured, the fiber bragg grating sensors will transmit signals to the controller, then the controller controls the first driving mechanism (3023), the second driving mechanism (3024), the third driving mechanism (3033) and the fourth driving mechanism (3034) to stop acting, at the moment, a self-inductive sensor at the fingertip of the index finger end joint (3022) will detect a metal object at the fingertip of the thumb end joint (3032) and transmits a signal to the controller, thus measuring and obtaining the thickness of the surface of the blade to be measured;

if the target to be measured is branches of trees or side branches of crops, the controller controls the first driving mechanism (3023) and the second driving mechanism (3024) in the soft mechanical hand module (300) to act respectively, and then controls the index finger connecting joint (3021) and the index finger end joint (3022) to rotate respectively until the index finger connecting joint (3021) and the index finger end joint (3022) surround the target to be measured; when a fiber bragg grating sensor on the soft cushion (304) and the fiber bragg grating sensor at the fingertip of the index finger end joint (3022) touch the target to be measured, the fiber bragg grating sensors will transmit signals to the controller, then the controller controls the first driving mechanism (3023) and the second driving mechanism (3024) to stop acting, and at the moment, the self-inductive sensor at the fingertip of the index finger end joint (3022) will detect the metal object on the soft cushion (304) and transmit a signal to the controller, thus measuring and obtaining the diameter of the target to be measured;

if the target to be measured is a trunks of trees and stems of crops, the controller controls the first driving mechanism (3023), the second driving mechanism (3024), the third driving mechanism (3033) and the fourth driving mechanism (3034) in the soft mechanical hand module (300) to act respectively, and then controls the index finger connecting joint (3021), the index finger end joint (3022), the thumb connecting joint (3031) and the thumb end joint (3032) to rotate respectively until the target to be measured is clamped by the fingertip of the index finger end joint (3022) and the fingertip of the thumb end joint (3032); when the fiber bragg grating sensor at the fingertip of the index finger end joint (3022) and the fiber bragg grating sensor at the fingertip of the thumb end joint (3032) touch the target to be measured, the fiber bragg grating sensors will transmit signals to the controller, then the controller controls the first driving mechanism (3023), the second driving mechanism (3024), the third driving mechanism (3033) and the fourth driving mechanism (3034) to stop acting, at the moment, the self-inductive sensor at the fingertip of the index finger end joint (3022) will detect the metal object at the fingertip of the thumb end joint (3032) and transmit a signal to the controller, thus measuring and obtaining the diameter of the target to be measured;

if the target to be measured is crown breadth, the controller controls sixth driving mechanisms (3025) in the automatic thumb telescopic arm and the automatic index finger telescopic arm in the soft mechanical hand module (300) to act respectively, and the automatic thumb telescopic arm and the automatic index finger telescopic arm will stretch; the controller controls the first driving mechanism (3023), the second driving mechanism (3024), the third driving mechanism (3033) and the fourth driving mechanism (3034) to act respectively, and then controls the index finger connecting joint (3021), the index finger end joint (3022), the thumb connecting joint (3031) and the thumb end joint (3032) to rotate respectively until the index finger connecting joint (3021), the index finger end joint (3022), the thumb connecting joint (3031) and the thumb end joint (3032) envelop the target to be measured; when the fiber bragg grating sensor at the fingertip of the index finger end joint (3022) and the fiber bragg grating sensor at the fingertip of the thumb end joint (3032) touch the target to be measured, the fiber bragg grating sensors will transmit signals to the controller, and then the controller controls the first driving mechanism (3023), the second driving mechanism (3024), the third driving mechanism (3033) and the fourth driving mechanism (3034) to stop acting, at the moment, the self-inductive sensor at the fingertip of the index finger end joint (3022) will measure the metal object at the fingertip of the thumb end joint (3032) and transmit a signal to the controller, thus measuring and obtaining the crown breadth of the target to be measured.

\* \* \* \* \*